United States Patent [19]

Nishizawa et al.

[11] Patent Number: 4,551,753

[45] Date of Patent: Nov. 5, 1985

[54] PICTURE SIGNAL PROCESSING SYSTEM INCLUDING SPATIO-TEMPORAL FILTER

[75] Inventors: Taiji Nishizawa; Yutaka Tanaka, both of Tokyo, Japan

[73] Assignee: Nippon Hoso Kyokai, Tokyo, Japan

[21] Appl. No.: 448,078

[22] Filed: Dec. 9, 1982

[30] Foreign Application Priority Data

Dec. 17, 1981 [JP] Japan ................... 56-204189
May 26, 1982 [JP] Japan ................... 57-88018
Sep. 9, 1982 [JP] Japan ................... 57-155788

[51] Int. Cl.$^4$ ............................................. H04N 5/02
[52] U.S. Cl. ...................... 358/140; 358/133; 358/138
[58] Field of Search ............... 358/133, 140, 166, 138; 364/731, 724; 343/5 SC

[56] References Cited

U.S. PATENT DOCUMENTS

| | | | |
|---|---|---|---|
| 3,832,487 | 8/1974 | de Miet | 358/140 |
| 4,275,422 | 6/1981 | Le Couteur | 358/140 |
| 4,298,888 | 11/1981 | Colles et al. | 358/140 |
| 4,386,367 | 5/1983 | Peterson et al. | 358/140 |
| 4,449,143 | 5/1984 | Dischert et al. | 358/140 |

Primary Examiner—Edward L. Coles, Sr.
Attorney, Agent, or Firm—Parkhurst & Oliff

[57] ABSTRACT

A picture signal processing for converting a wideband high quality picture signal between interlace and sequential scanning systems is effected through a spatio-temporal filter based on multi-dimensional coordinates consisting of at least vertical frequency and temporal frequency axes. A passing region of the spatio-temporal filter is restricted to lower regions of the multi-dimensional coordinates including an origin thereof for separating original picture signal components from unnecessary signal components generated by the scanning conversion in order to maintain the high picture quality. The performance of the spatio-temporal filter is improved in consideration of the motion of the picture and the ambiguous contour of the still picture which is caused by the scanning conversion.

28 Claims, 75 Drawing Figures

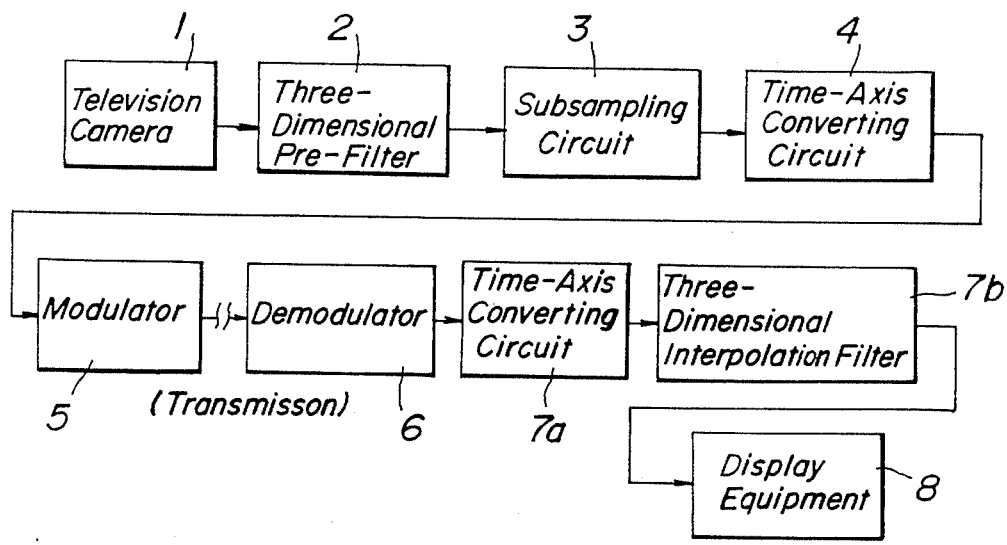
FIG._1
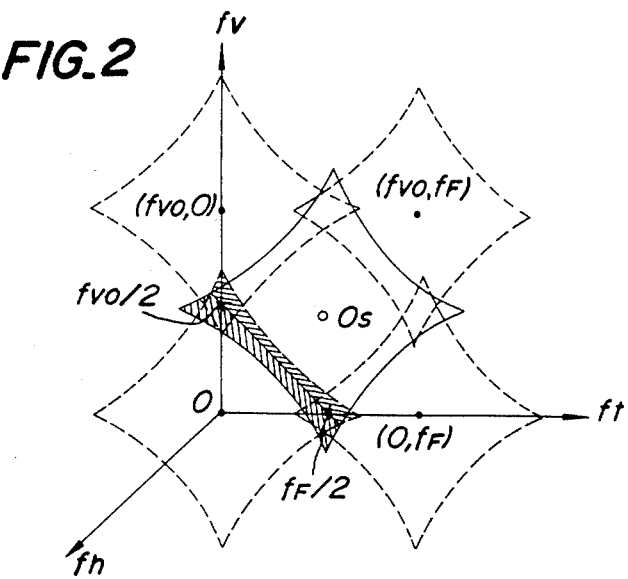
FIG._2

FIG_5

FIG_14
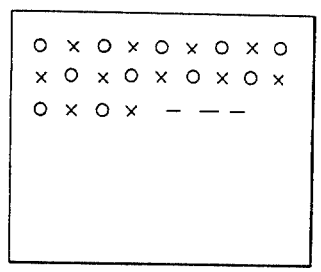
FIG_15
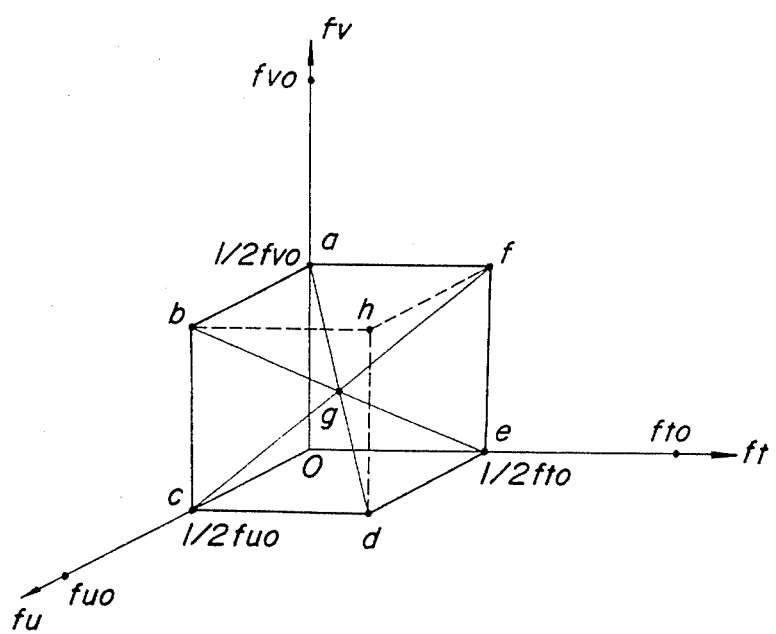

FIG. 16a
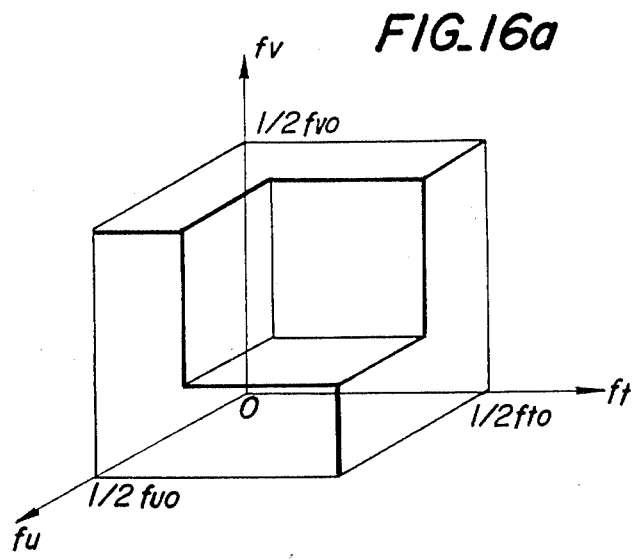
FIG. 16b
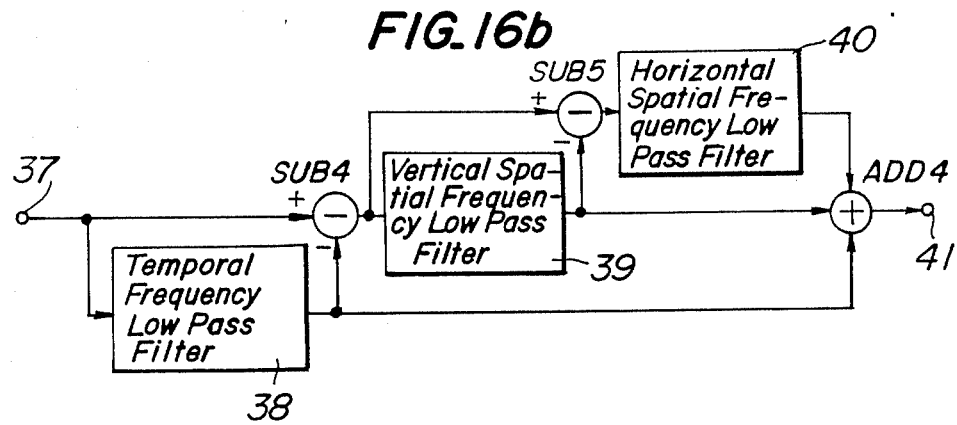
FIG. 16c

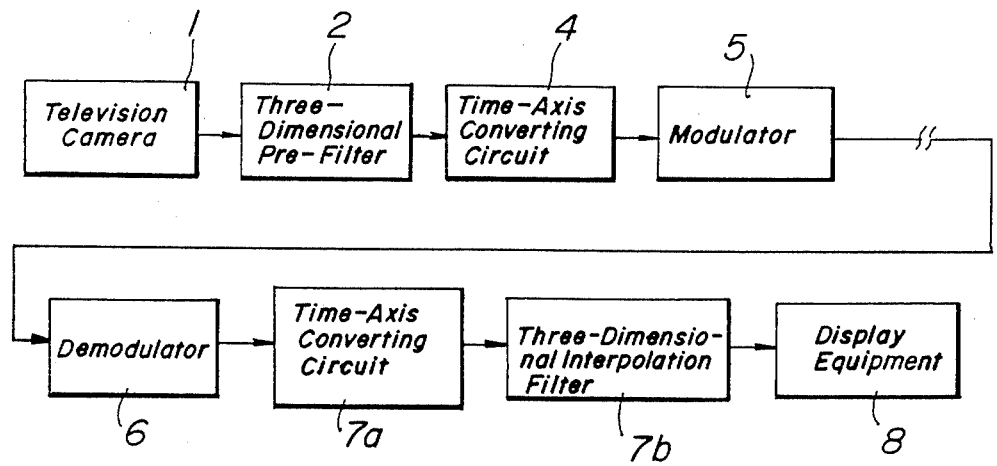
FIG_23
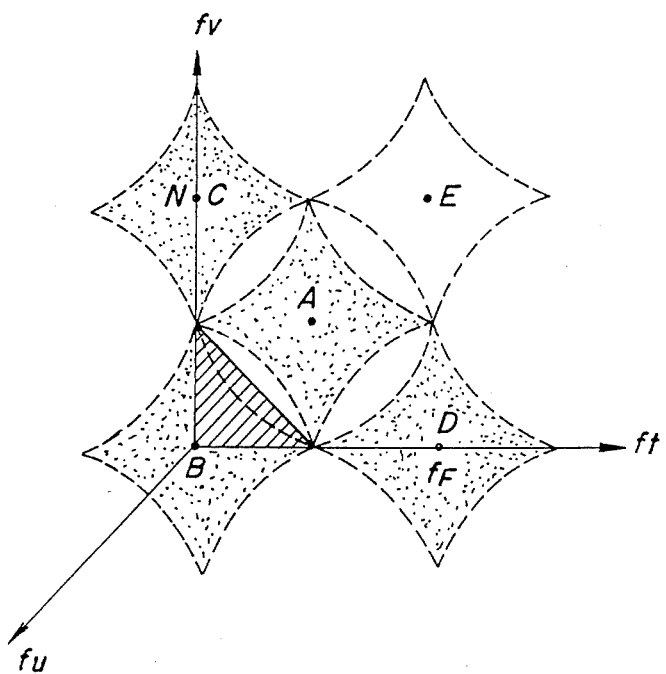
FIG_24

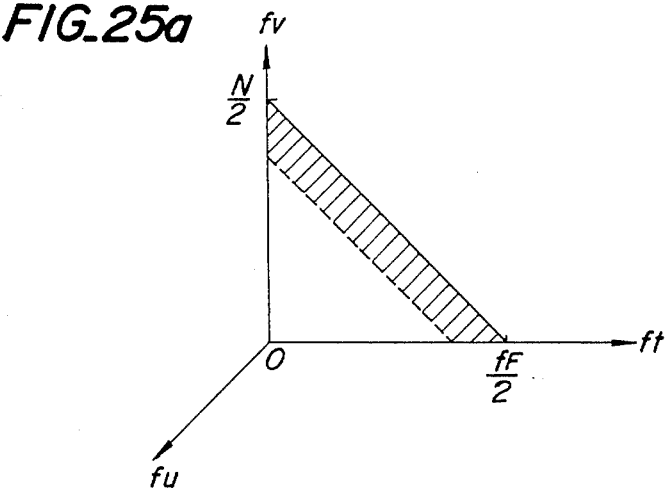
FIG_25a
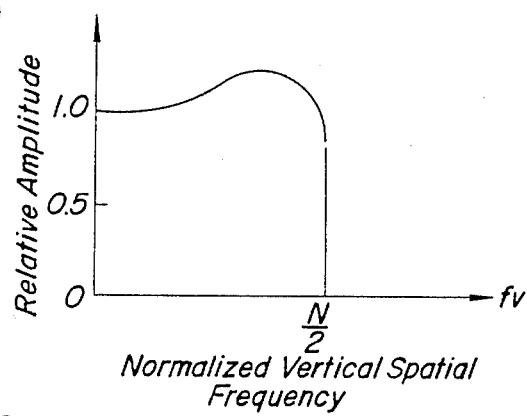
FIG_25b
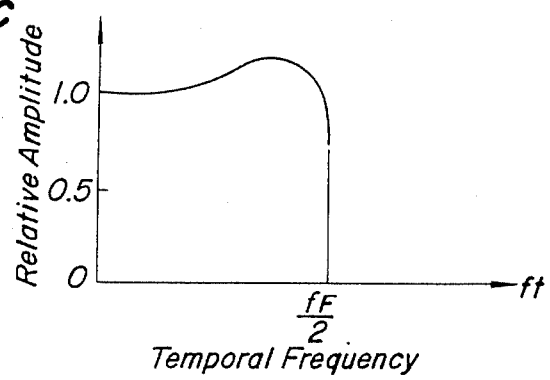
FIG_25c

FIG_26
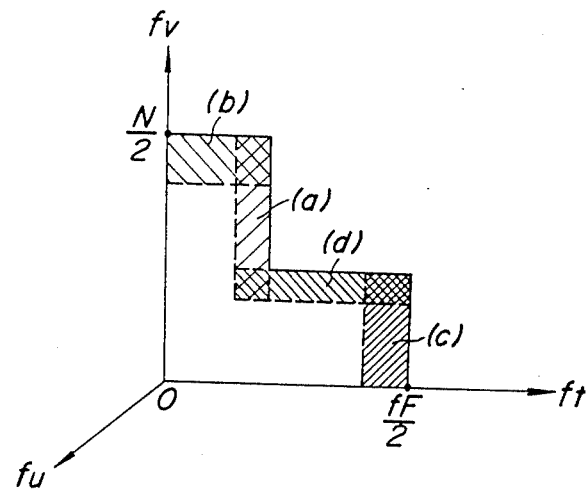
FIG_27
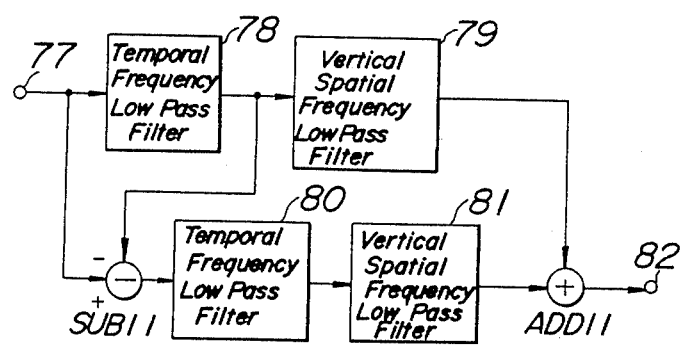

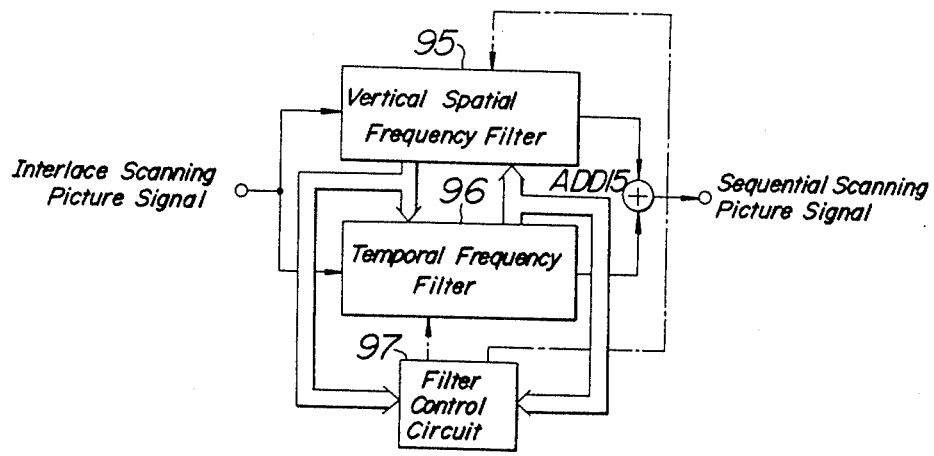
FIG.34
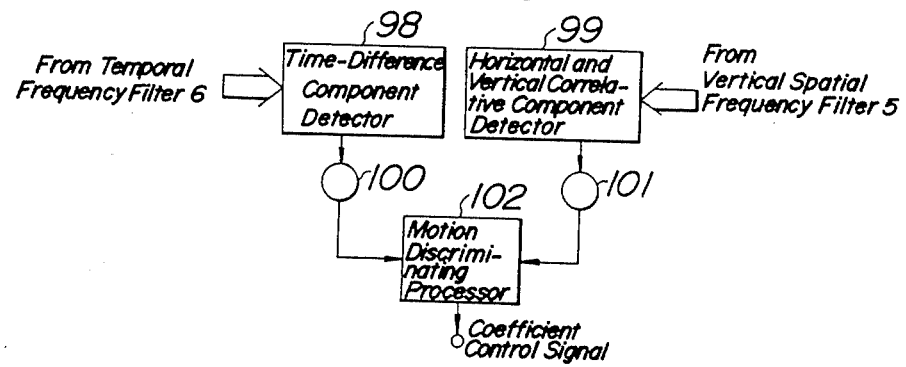
FIG.35
FIG.36a  FIG.36b  FIG.36c
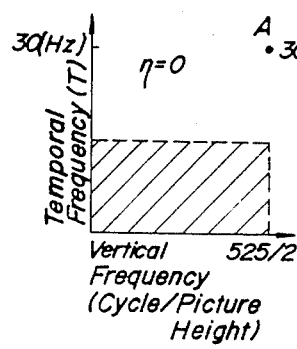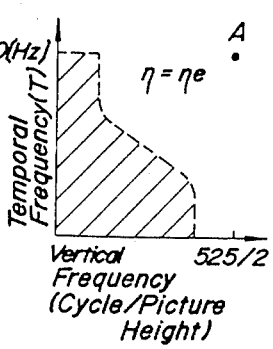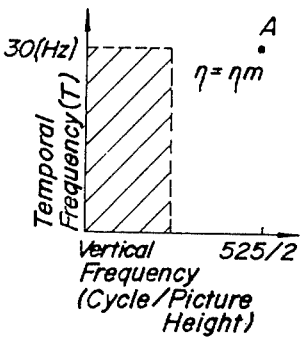

FIG_38a
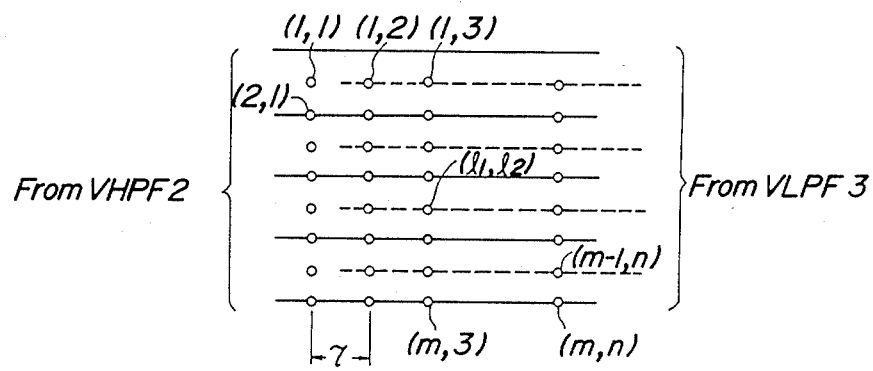
FIG_38b
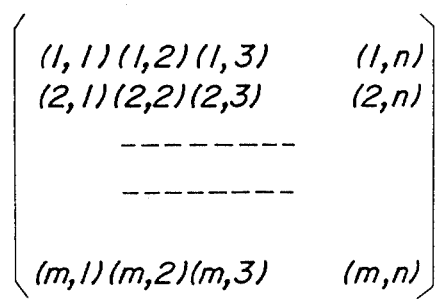

PICTURE SIGNAL PROCESSING SYSTEM INCLUDING SPATIO-TEMPORAL FILTER

BACKGROUND OF THE INVENTION (1) Field of the Invention

The present invention relates to a picture signal processing system including a spatio-temporal filter for converting a high quality picture information signal between interlace and sequential scanning systems through a spatio-temporal filter for removing injurious multi-dimensional higher range components caused by the scanning conversion.

(2) Description of the Prior Art

The conversion of scanning systems is frequently utilized for transmitting a wideband television picture signal through a narrower band transmission line and reproducing it with a high picture quality. In the picture signal processing system of this kind, the scanning conversion from the sequential system to the interlace system is usually effected for reducing a frequency band width required for transmitting a sequential scanning high quality picture signal accompanied with no deterioration of picture quality in the reproduction thereof. However, the reproduced interlace scanning picture has various defects such as the noticeable line structure of alternate fields and the impaired natural motion of picture cause the serious deterioration of picture quality. Particularly, the reproduced line-interlace scanning picture has an essential defect that the vertical resolution thereof is reduced to about 70% of an expectancy based on the number of lines by the above mentioned line structure. So that, regarding the high quality television, the interlace scanning picture signal, which has an advantage that the transmission band width can be reduced with the maintained flicker performance, is adopted principally into the transmission thereof. That is, the high quality sequential scanning picture signal, which has a number per second of frames increased more than the standard thereof, is intermittently sampled and expanded along the time axis, so as to be converted into the interlace scanning picture signal which can be transmitted through the narrower band transmission line.

In the above situation where the signal is sampled for the conversion of temporal frequency domain, unnecessary frequency components other than necessary frequency components generated by the conversion, including the sampling frequency component and harmonics thereof, are apt to be generated and intermixed with essential picture signal components, particularly, higher frequency range components, so that the expected high quality of the reproduced picture is seriously deteriorated as an essential problem.

For removing the above unnecessary frequency components accompanying the sampling of the picture signal, a conventional filter having a simple frequency response based on a simple one-dimensional constitution has been employed. However, particularly for removing those unnecessary frequency components from the high quality picture signal such as a high definition television signal, it is required to effect the multi-dimensional processing, for instance, two- or three-dimensional processing upon signal components appearing along horizontal and vertical frequency axes as well as along a temporal frequency axis of multi-dimensional coordinates along with the above mentioned scanning conversion including the sampling.

Moreover, the above mentioned multi-dimensional processing is required at the receiving end of the transmission line in which the converted interlace scanning picture signal is reconverted into the original sequential scanning picture signal to be displayed with the high definition, for removing unnecessary signal components generated in connection with conversion.

SUMMARY OF THE INVENTION

An object of the present invention is to provide a picture signal processing system including a spatio-temporal filter for converting a high quality picture information signal between interlace and sequential scanning systems through a spatio-temporal filter for removing injurious multi-dimensional higher range components generated along horizontal and vertical frequency axes and temporal frequency axis of multi-dimensional coordinates in connection with the scanning conversion under the investigation of various signal components, which are generated on the basis of the conversion of the amount of information accompanying the scanning conversion between the interlace and the sequential scanning systems by means of regarding those signal components as the spectrum distribution on the above multi-dimensional coordinates.

Another object of the present invention is to provide a picture signal processing system including a spatio-temporal filter wherein a picture signal is processed by using a spatio-temporal filter for removing unnecessary higher range signal components in response to an arrangement of picture signal spectrum on multi-dimensional coordinates including at least vertical frequency and temporal frequency axes.

Still another object of the present invention is to provide a picture signal processing system including a spatio-temporal filter wherein a picture signal quality is further improved by emphasizing higher range signal components passing a spatio-temporal filter.

Further another object of the present invention is to provide a picture signal processing system including a spatio-temporal filter wherein the removal of unnecessary signal components generated in connection with the sampling of a picture signal is effected by employing a spatio-temporal filter provided at least on either one of transmitting and receiving ends of a transmission line.

A still further another object of the present invention is to provide a picture signal processing system including a spatio-temporal filter wherein a response of a spatio-temporal filter employed for converting a high quality picture signal between interlace and sequential scanning systems therethrough is varied in response to an arrangement of a picture signal spectrum on multi-dimensional coordinates including at least vertical frequency and temporal frequency axes in consideration of a picture motion, so as to restrict the converted picture signal within each signal range required for a still picture and a motion picture respectively.

A still further another object of the present invention is to provide a picture signal processing system including a spatio-temporal filter wherein the spatio-temporal filter is formed as of the so-called adaptive filter type, the performance of which is controlled on the basis of the correct detection of the picture performance, particularly, the correct detection of the amount of temporal picture motion.

A still further another object of the present invention is to provide a picture signal processing system including a spatio-temporal filter wherein a required performance of a spatio-temporal filter employed for processing a picture signal can be maintained against the application of the picture signal containing various noise and spurious components.

A feature of a picture signal processing system including a spatio-temporal filter according to the present invention, wherein a wideband high quality picture signal is converted between interlace and sequential scanning systems, is that the scanning conversion is effected with respect to multi-dimensional coordinates consisting of at least a horizontal frequency axis, a vertical frequency axis and a temporal frequency axis; regarding at least a coordinate plane extended along the vertical frequency axis and the temporal frequency axis, a lower region in which the picture signal exists originally and a higher region in which an unnecessary signal component appears in connection with the scanning conversion are separated from each other by a symmetrical line intercrossing both of the vertical frequency axis and the temporal frequency axis; and a passing region of the spatio-temporal filter is substantially restricted to the lower region including an origin of the multi-dimensional coordinates.

BRIEF DESCRIPTION OF THE DRAWINGS

For the better understanding of the invention, reference is made to the accompanying drawings, in which:

FIG. 1 is a block diagram showing a basic configuration of a picture signal processing apparatus according to the present invention;

FIG. 2 is a diagram showing the principle of operation of the picture signal processing according to the present invention;

Figure 6:
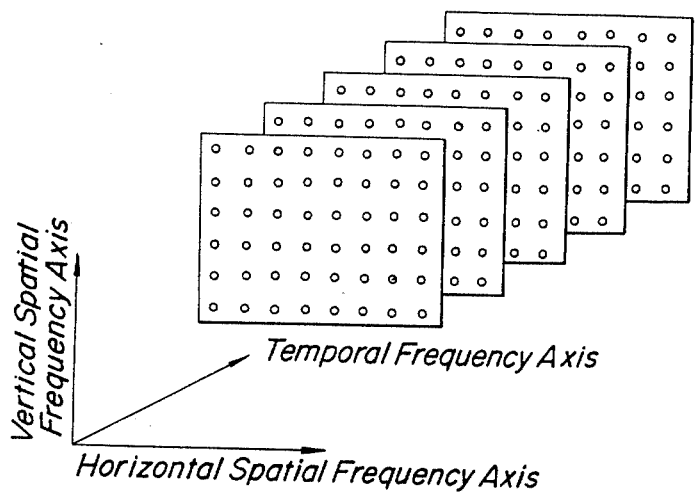
FIG. 6 is a diagram showing an example of three-dimensional arrangement of a picture signal to be processed according to the present invention.
Figure 8:
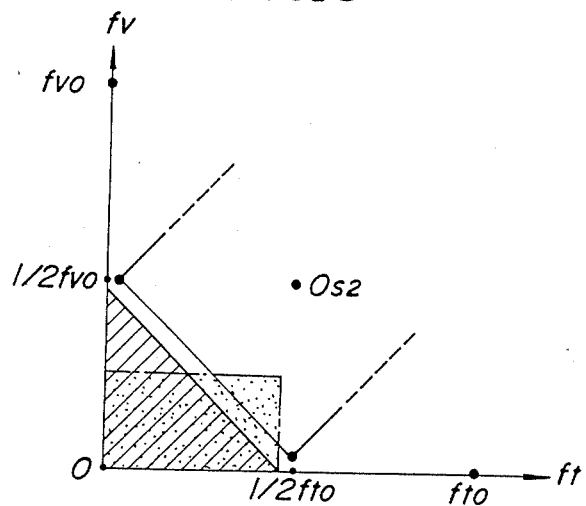
Figure 9A:
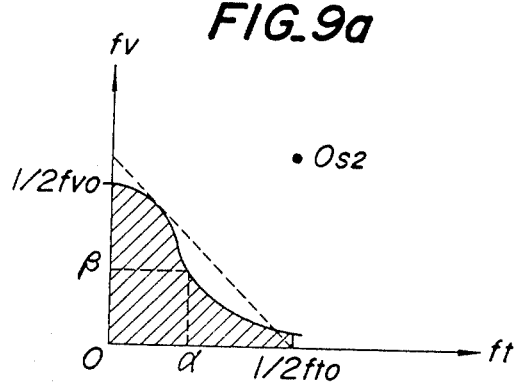
Figure 10A:
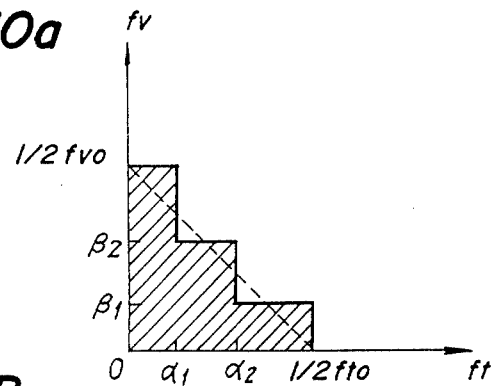
Figure 11:
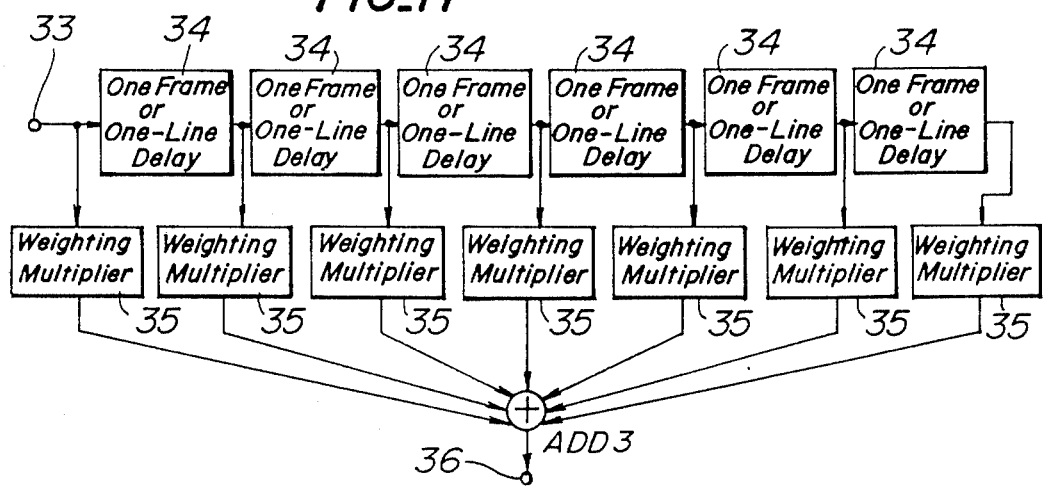
Figure 12:
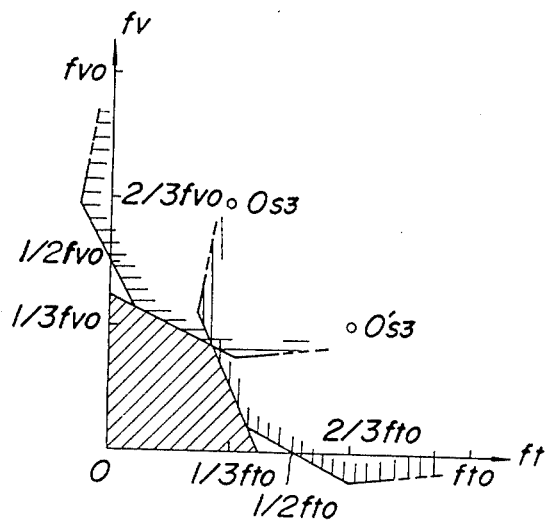
Figure 13:
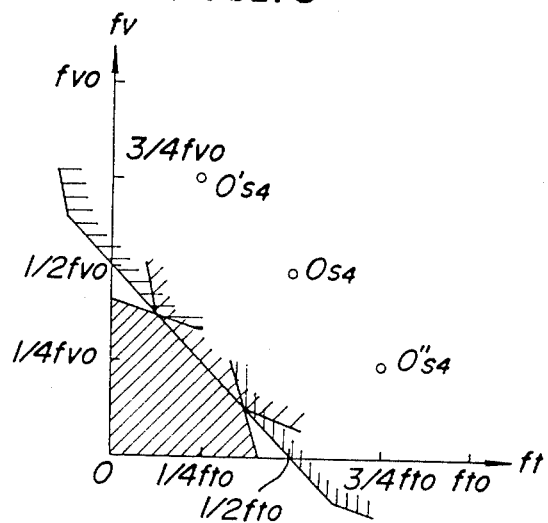
Figure 17:
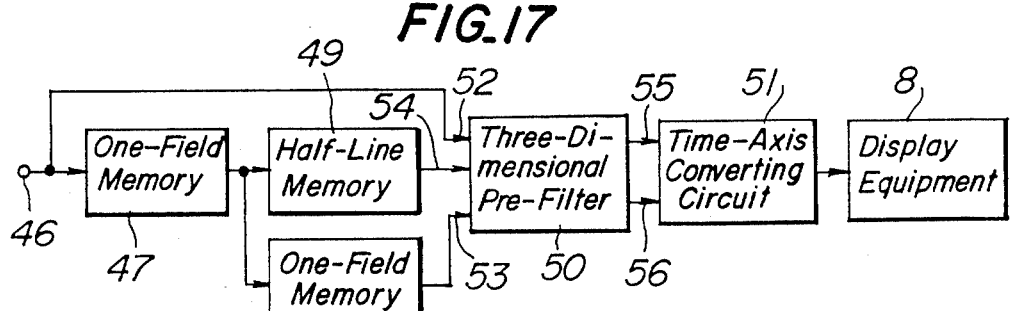
Figure 18:
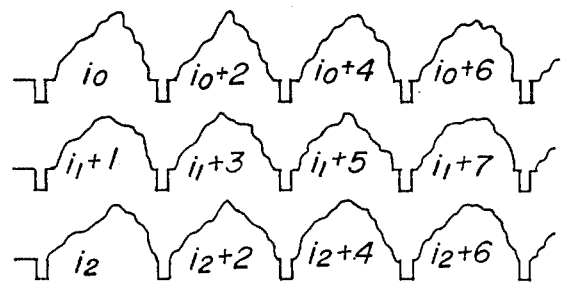
Figure 19A:
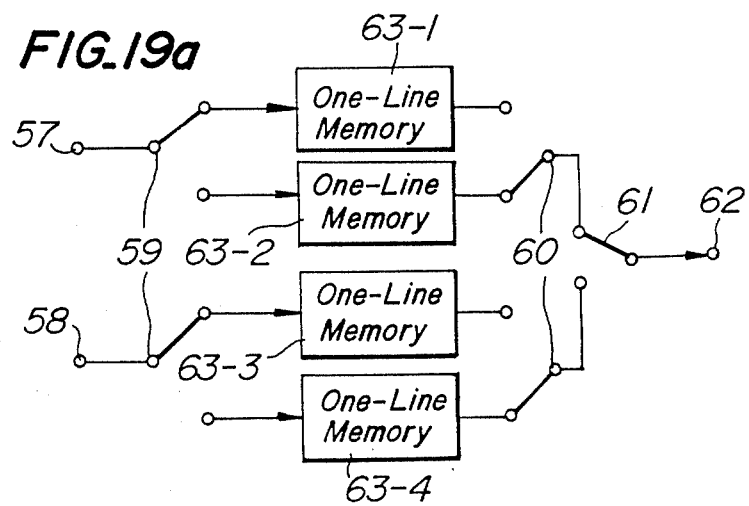
Figure 20A:
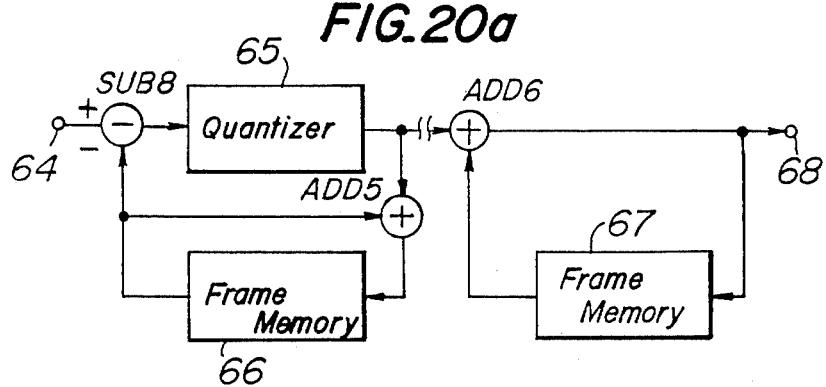
Figure 21:
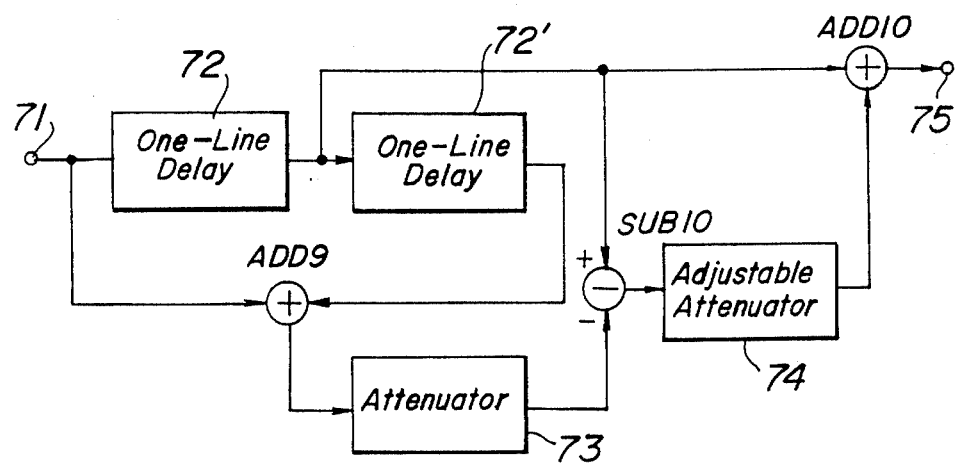
Figure 22:
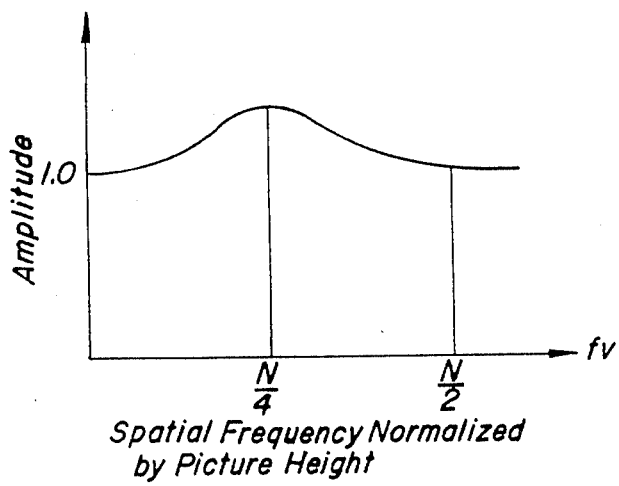
Figure 28:
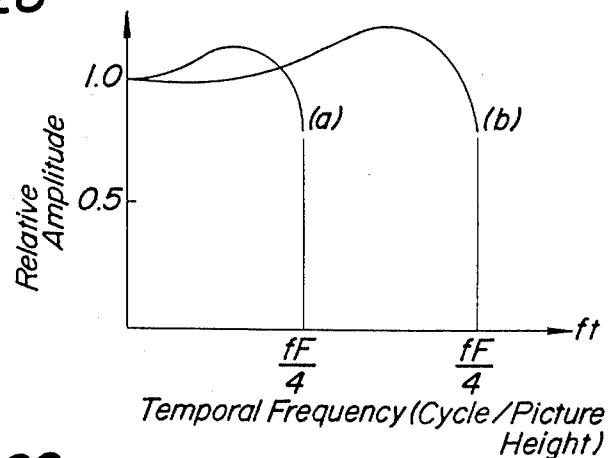
Figure 29:
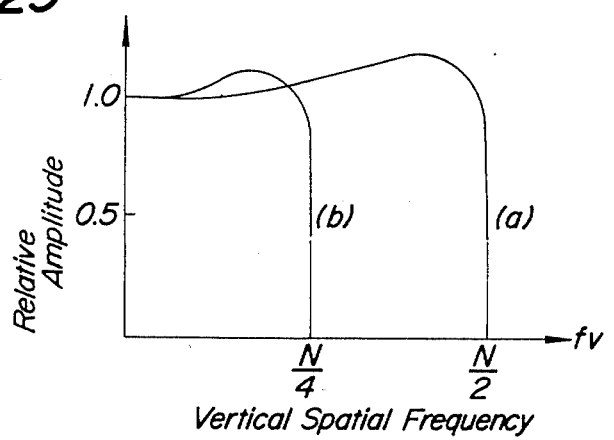
Figure 30:
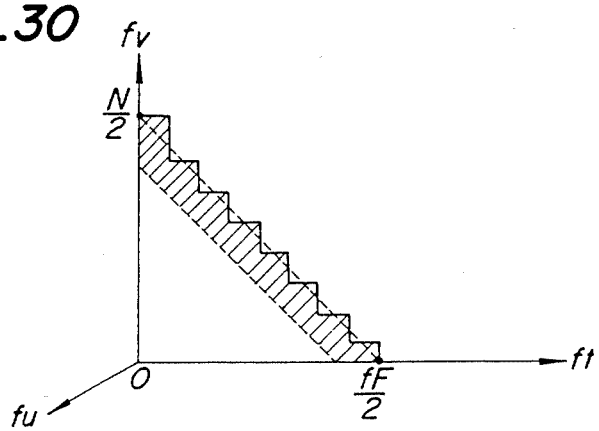
Figure 31:
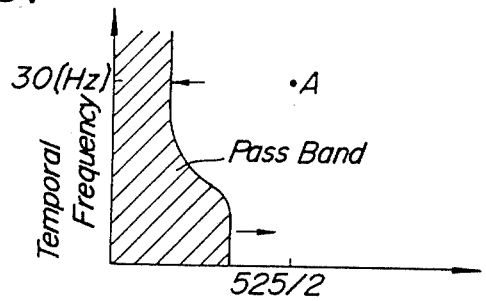
Figure 32:
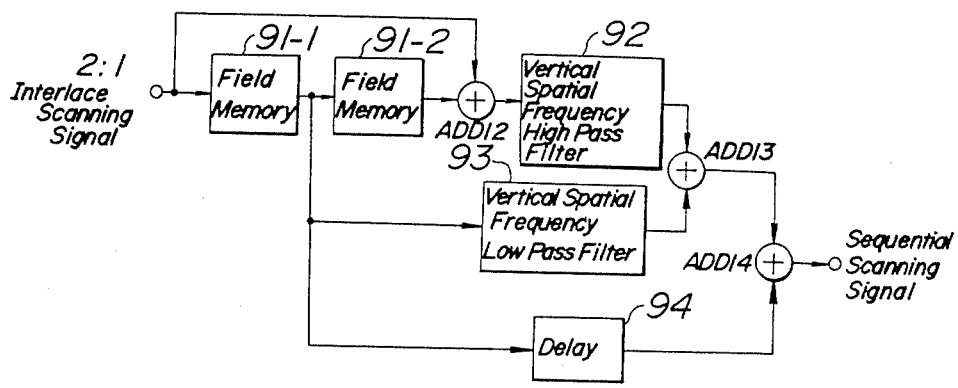
Figures 33A, 33B, 33C:
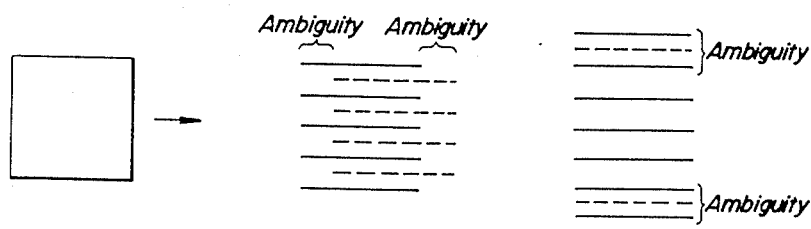
Figure 39:
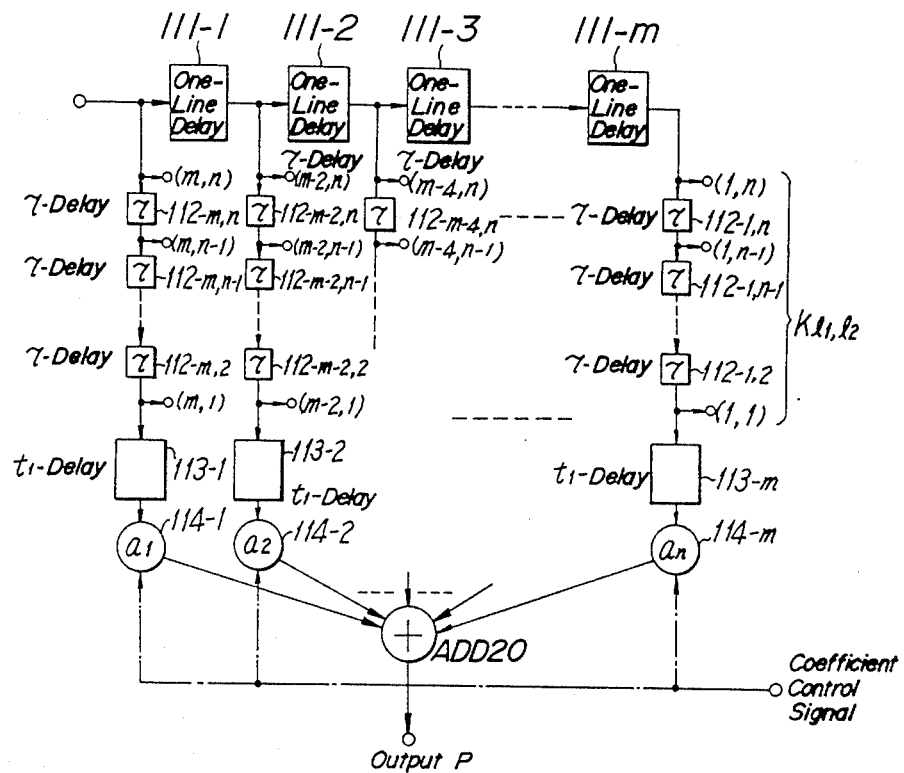
Figure 40:
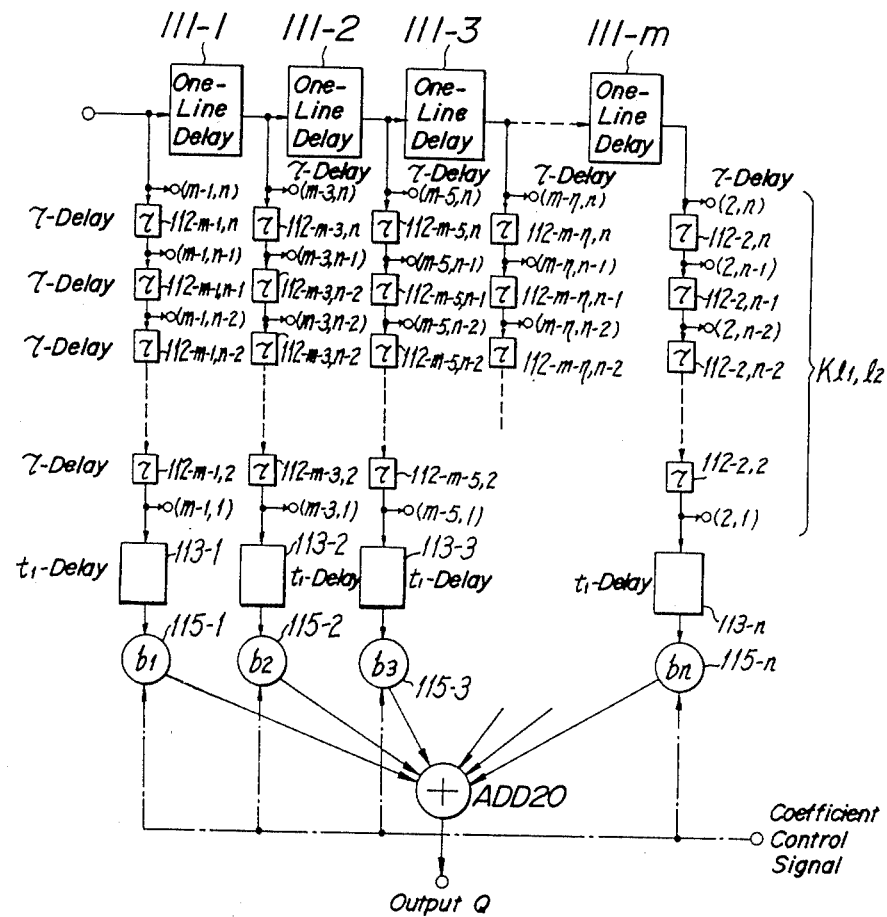
Figure 41:
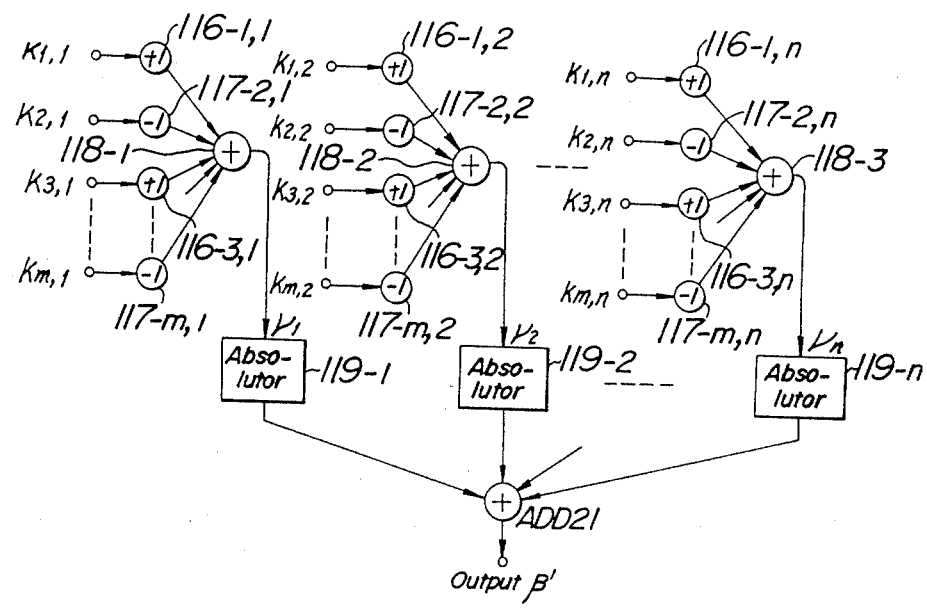
Figure 42:
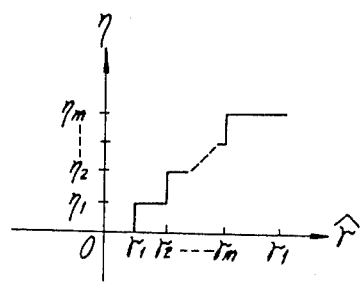
Figure 43:
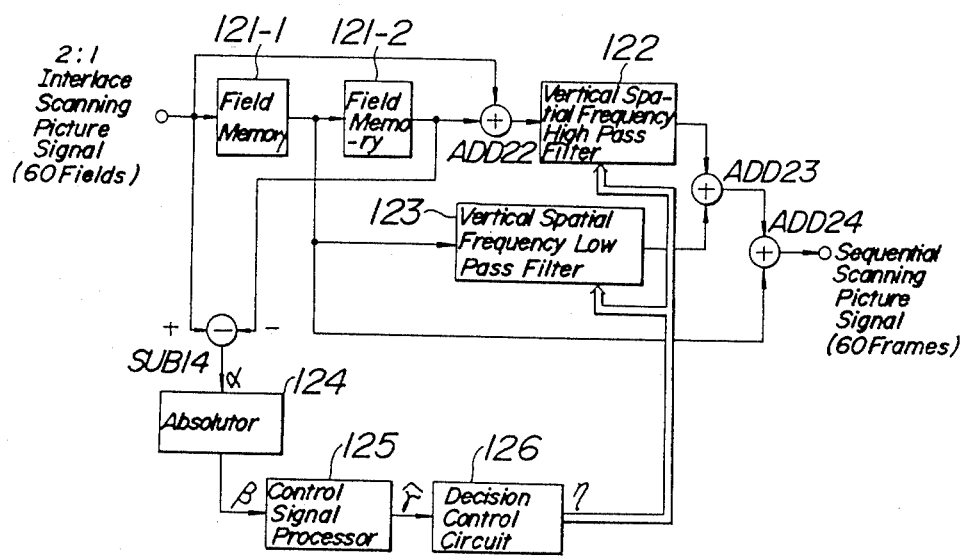
Figure 44:
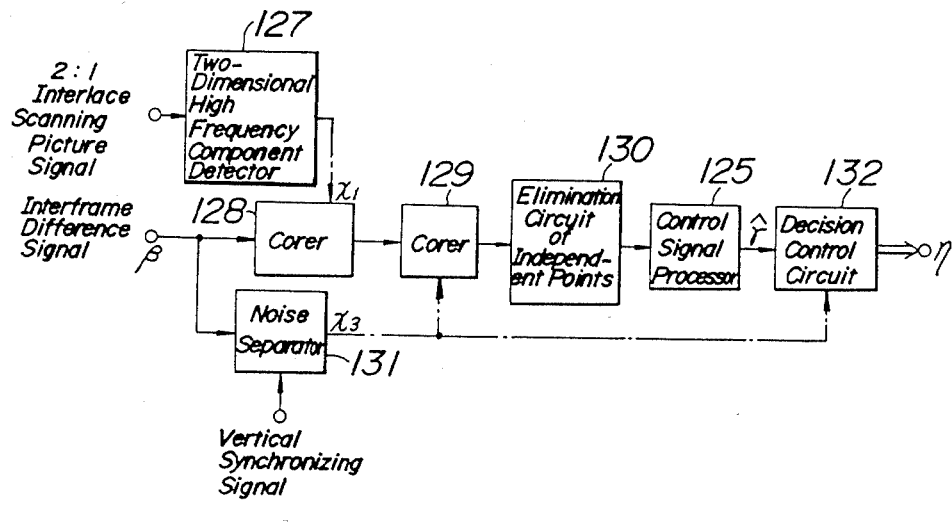
Figure 45:
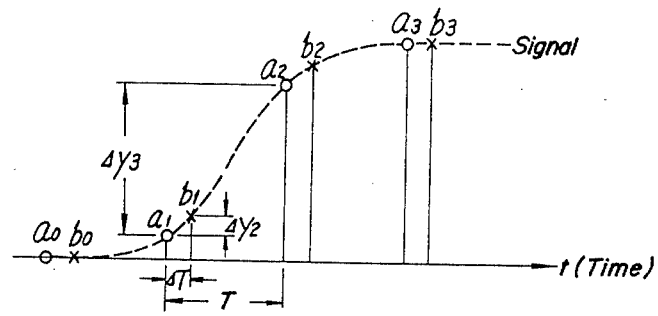
Figures 46A, 46B:
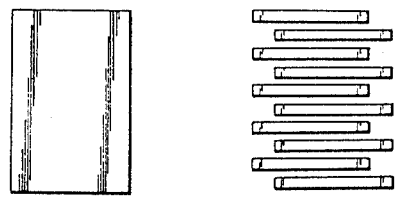
Figure 47:
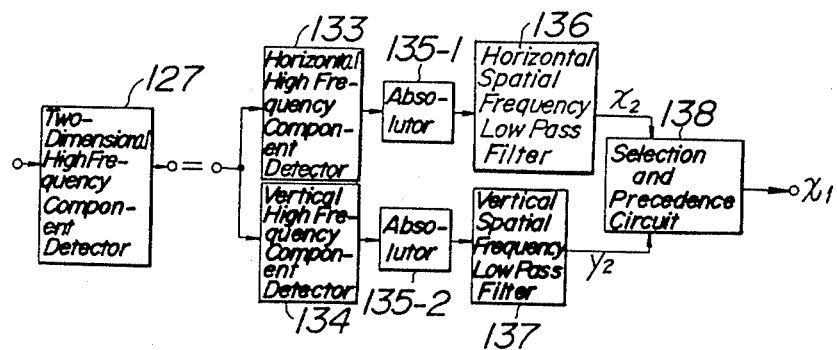
Figure 48:
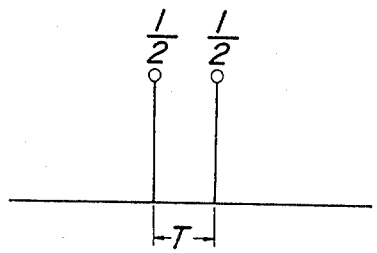
Figure 50:
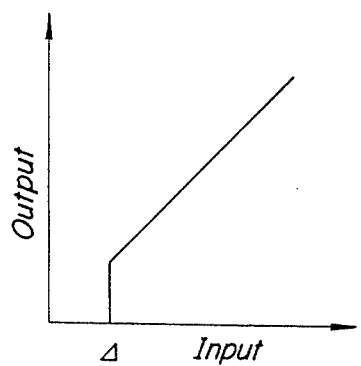
Figure 51:
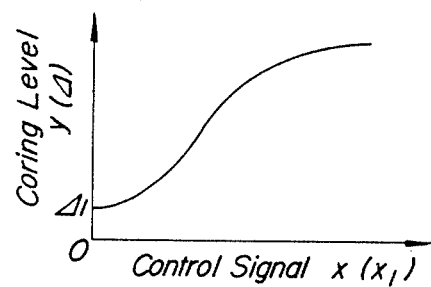
Figure 52:
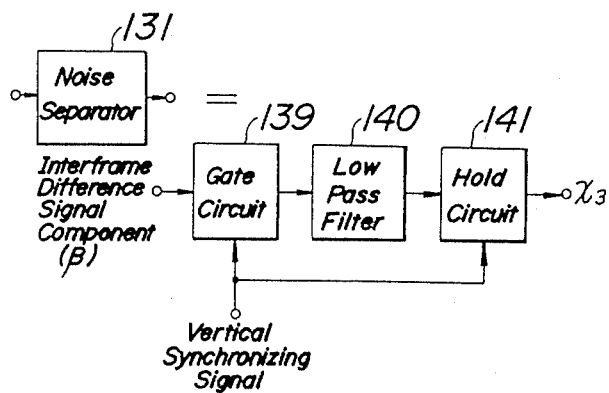
Figure 53:
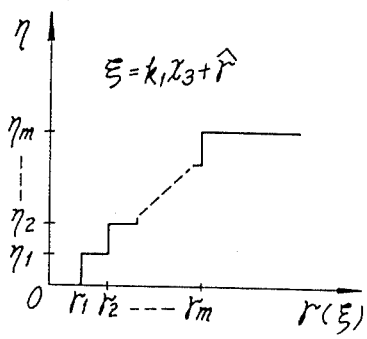

FIG. is a diagram showing an example of a frequency component distribution of the same as shown in FIG. 6;

FIG. 8 is a diagram showing an example of a passing region required for a three-dimensional low-pass filter consisting in the basic configuration as shown in FIG. 1;

FIGS. 9(a) and (b) are a diagram and a block diagram showing examples of a practical passing region and a configuration of the same filter respectively;

FIGS. 10(a) and (b) are a diagram and a block diagram showing other examples of the same respectively;

FIG. 11 is a block diagram showing an example of a practical detailed configuration of the same filter;

FIG. 12 is a diagram showing another example of the same;

FIG. 13 is a diagram showing still another example of the same;

FIG. 14 is a diagram showing an example of a two-dimensional arrangement of a picture signal to be processed according to the present invention;

FIG. 15 is a diagram showing an example of a frequency component distribution on three-dimensional coordinates of the same;

FIGS. 16(a), (b) and (c) are a diagram and block diagrams showing other examples of the required passing region and the configurations of the three-dimensional filter respectively;

FIG. 17 is a block diagram showing an example of a receiving configuration of the picture signal processing apparatus according to the present invention;

FIG. 18 is a diagram showing an example of an operation of the picture signal processing in the same receiving configuration;

FIGS. 19(a) and (b) are a block diagram and a diagram showing other examples of the same receiving configuration and the same operation of the same respectively;

FIGS. 20(a) and (b) are block diagrams showing examples of a picture signal encoding apparatus and the same applied with the picture signal processing according to the present invention respectively;

FIG. 21 is a block diagram showing an example of a configuration of a conventional picture contour compensating circuit applied with the picture signal processing according to the present invention;

FIG. 22 is a diagram showing an example of a compensating characteristic curve of a conventional picture contour compensating circuit;

FIG. 23 is a block diagram showing an example of a configuration of a picture contour compensating circuit according to the present invention, which is applied with the picture signal processing according to the present invention;

FIG. 24 is a diagram showing a principle of operation of the same;

FIGS. 25(a), (b) and (c) are diagrams showing examples of a passing region required for a three-dimensional filter used for the same picture contour compensating circuit and a boosted characteristic curve of the same filter respectively;

FIG. 26 is a diagram showing an example of a practical passing region of the same filter;

FIG. 27 is a block diagram showing an example of a detailed configuration of the same filter;

FIG. 28 is a diagram showing another example of the boosted characteristic curve of the same filter;

FIG. 29 is a diagram showing still another example of the same characteristic curve;

FIG. 30 is a diagram showing another example of the practical passing region of the same filter;

FIG. 31 is a diagram showing a typical performance required for a spatio-temporal interpolating filter;

FIG. 32 is a block diagram showing an example of a conventional spatio-temporal filter;

FIGS. 33(a), (b) and (c) are diagrams showing an example of a state of an occurrence of a picture contour ambiguity caused by the same in order;

FIG. 34 is a block diagram showing a basic configuration of an adaptive spatio-temporal filter according to the present invention;

FIG. 35 is a block diagram showing a basic configuration of a filter control circuit consisting in the same;

FIGS. 36(a) to (c) are diagrams showing examples of a state of variation of a filter performance of the same in order;

FIGS. 37(a) to (e) are block diagrams and diagrams showing examples of a detailed configuration, a state of forming of a filter control signal, a construction of processing circuit and signal waveforms of various portions of the same respectively;

FIGS. 38(a) and (b) are diagrams showing examples of an arrangement of a picture signal detecting point on which the forming of a performance control signal of the same is based respectively;

FIG. 39 is a block diagram showing an example of a detailed configuration of a vertical spatial frequency high-pass filter consisting in the same;

FIG. 40 is a block digram showing an example of a detailed configuration of a vertical spatial frequency low-pass filter consisting in the same;

FIG. 41 is a block diagram showing an example of a detailed configuration of horizontal and vertical correlation component detecting circuit consisting in the same;

FIG. 42 is a diagram showing an example of an input to output characteristic curve of a decision control circuit consisting in the same;

FIG. 43 is a block diagram showing a configuration of a conventional adaptive spatio-temporal interpolation filter;

FIG. 44 is a block diagram showing an example of a configuration of a principal part of an adaptive spatio-temporal interpolation filter according to the present invention;

FIG. 45 is a diagram showing an example of a state of generation of a spurious interframe difference signal component in a horizontal direction contour portion of a picture signal;

FIGS. 46(a) and (b) are diagrams showing examples of a state of occurrence of a dual image disturbance caused by the generation of the spurious interframe difference signal component in order;

FIG. 47 is a block diagram showing an example of a detailed configuration of a two-dimensional space higher region detecting circuit consisting in the configuration as shown in FIG. 44;

FIG. 48 is a diagram showing an example of an impulse response of a low-pass filter consisting in the configuration as shown in FIG. 47;

FIGS. 49(a) to (e) are diagrams showing examples of an operation and an effect of the same as shown in FIG. 48 in order;

FIG. 50 is a diagram showing an example of an input to output characteristic curve of a coring circuit consisting in the configuration as shown in FIG. 44;

FIG. 51 is a diagram showing an example of a coring level control characteristic curve of the same;

FIG. 52 is a block diagram showing an example of a detailed configuration of a noise separation circuit consisting in the configuration as shown in FIG. 44; and FIG. 53 is a diagram showing an example of an input to output characteristic curve of a decision control circuit consisting in the configuration as shown in FIG. 44.

DESCRIPTION OF THE PREFERRED EMBODIMENTS

Firstly, an example of a circuit configuration for converting a high quality picture signal between interlace and sequential scanning systems in the situation where a sequential scanning wideband picture signal is transmitted through a narrower band transmission line in a form of a converted interlace scanning picture signal according to the present invention is shown in FIG. 1. In this configuration, multi-dimensional spatio-temporal filters 2 and 7b as mentioned earlier are provided at a sending and a receiving end respectively. Particularly, the multi-dimensional spatio-temporal filter 2 is provided for preventing a sampling frequency component and harmonics thereof, which are generated by the sampling required for the scanning conversion, to intermix with original picture signal spectra as so-called aliasing signal components regarding a sampling frequency point effecting as an imaginary origin. That is to say in detail, a wideband picture signal having 525 lines and 60 frames per second, which is a high quality television camera 1 of line sequential scanning system, generally has a spectrum distribution on three-dimensional coordinates consisting of horizontal and vertical frequency axes and a temporal frequency axis as shown in FIG. 2. For instance, on a coordinate plane extended along the vertical frequency and the temporal frequency axes, a statistical signal spectrum distribution of a camera target proper which is spread within a region centered by an origin, as shown by a surrounding dotted line, in response to a variation in the vertical direction of a motion of the picture and other signal spectrum distributions which are respectively spread within other regions being similar to the above region centered by the origin, which are respectively centered by a point $(f_{vo}, O)$ situated on the vertical frequency axis $f_v$ in response to a vertical scanning frequency $f_{vo}$ regarding the scanning of a camera shooting the above target, points $(O, f_F)$ and $(f_{vo}, f_F)$ situated on the temporal frequency axis $f_t$ in response to a number $f_F$ of frames per second and a coordinate point $(f_{vo}, f_F)$, compose spatial spectrum components nearly surrounding the origin. In this connection, the frequency points $f_{vo}$ and $f_F$ situated respectively on the vertical frequency and the temporal frequency axes are situated at equal distances from the origin according to the normalization as shown in FIG. 2.

Figure 3:
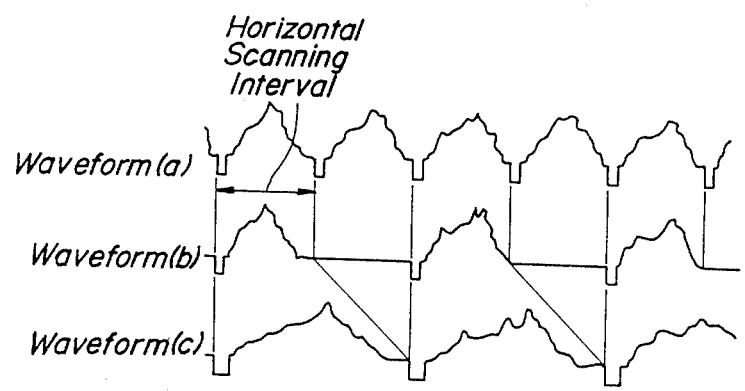
FIG. 3 is a diagram showing examples of signal waveforms at various portions of the configuration as shown in FIG. 1.

In a situation where a wideband picture signal as shown by a waveform (a) in FIG. 3, which presents a spatial spectrum distribution as mentioned above, is not applied through the multi-dimensional spatio-temporal filter 2 as shown in FIG. 1, but directly to the subsampling circuit 3 and the time axis converting circuit 4, so as to be converted to a conventional narrow band picture signal (c), as shown in FIG. 3, of interlace scanning system defined, for instance, by 525 lines, 60 fields and 30 frames, which is formed through a signal processing in the subsampling circuit 3 for two fold expanding a time axis of an intermittent picture signal (b), as shown in FIG. 3, consisting of either odd lines or even lines of the wideband picture signal (a), a spatial spectrum distribution of the intermittent picture signal (b) derived from the subsampling circuit 3 becomes as follows. That is, in this spatial spectrum distribution, in addition to the signal spectrum distribution within the region as mentioned above by referring to FIG. 2, a new signal spectrum is distributed within a new region, which is spread, as shown by a solid line in FIG. 2, similarly as the original regions as shown by dotted lines, and centered by a new coordinate point $(f_{vo}/2, f_F/2)$ which is situated in response to a new vertical scanning frequency $f_{vo}/2$ and a new number $f_F/2$ of frames per second, based on the above mentioned signal processing for forming the intermittent picture signal (b). Moreover, as shown in FIG. 2, the original regions surrounded by dotted lines and the new region surrounded by the solid line are respectively overlapped to each other as shown by shading in FIG. 2. Among those overlapped portions between those signal spectrum regions, the overlapped portion relating to the original region centered by the origin intermixes with the so-called aliasing component regarding the new coordinate point ($f_{vo}/2$, $f_F/2$) effecting as the imaginary origin $O_s$ with the necessary picture signal spectrum proper and, as a result, the reproduced picture quality is seriously deteriorated by the aliasing signal distortion.

In the scanning conversion of the high quality picture signal according to the present invention based on the mentioned above, the aliasing signal distortion caused by the sampling of the picture signal can be prevented to appear at least on the two-dimensional coordinate plane stretched along the vertical frequency and the temporal frequency axes by employing the multi-dimensional spatio-temporal filter, so as to maintain the sufficiently high quality of the reproduced picture signal. Since the above mentioned aliasing signal components generated by the sampling is spreaded around the imaginary origin $O_s$ and, as a result, invades the proper picture signal spectrum region, the necessary picture signal spectrum region centered by the proper origin O and the unnecessary aliasing signal spectrum region centered by the imaginary origin $O_s$ should be symmetrically separated by a straight line situated on the coordinate plane equally apart from both of the proper and the imaginary origins O and $O_s$ through the point ($f_{vo}/2$, O) on the vertical frequency axis and the point (O, $f_F/2$) on the temporal frequency axis, and, as a result, the necessary picture signal spectrum region should be restricted to the side including the proper origin O regarding the above straight line.

According to the present invention, the above mentioned signal processing for forming the intermittent picture signal (b) is effected within the proper picture signal spectrum region restricted as mentioned above by employing the multi-dimensional, for instance, two-dimensional or three-dimensional spatio-temporal low-pass filter, which is composed as described later according to the present invention.

Consequently, according to the present invention, although the above mentioned restriction of the necessary picture spectrum region causes a little reduction of the higher region signal component, the resultant reproduced picture quality is distinctly excellent more than that of a conventional picture quality transmitted and reproduced as the intermixed aliasing signal component is left as it is, and, as a result, the expectant high quality of the reproduced picture signal can be realized.

According to the mentioned above, in the picture signal processing apparatus of the present invention which is arranged as shown in FIG. 1, the line-sequential scanning wideband picture signal (a) derived from the television camera 1 is applied to the multi-dimensional spatio-temporal low-pass filter 2, so as to remove signal components appearing within the shaded region on the outside of the above mentioned straight line passing through the points ($f_{vo}/2$, O) and (O, $f_F/2$) on the coordinate plane as shown in FIG. 2 from the necessary picture signal components appearing within the proper region centered by the origin O. Those necessary picture signal components derived from the filter 2 are converted into the conventional narrow band picture signal of interlace scanning system through the aforesaid process of intermittent extraction of scanning lines and expansion of time axis in the subsampling circuit 3 and the time-axis converting circuit 4. The narrow band picture signal derived from those circuits 3 and 4 in the state that the required transmission frequency band is reduced is applied to the transmission line through the modulator 5. At the receiving end of the transmission line, the received narrow band picture signal of interlace scanning system is applied to the time-axis converting circuit 7a through the demodulator 6, so as to be reconverted into a quasi wideband picture signal formed by restoring the original wideband picture signal of line sequential scanning system. The quasi wideband picture signal derived from the converting circuit 7a is applied to the display equipment 8 through the other multi-dimensional spatio-temporal filter 7b, so as to display the reproduced high quality picture signal. In this connection, the proper signal spectrum region of the received narrow band picture signal is restricted by the spatio-temporal filter 2 provided at the sending end as mentioned above, and, as a result, is prevented from the intermixture of the aforesaid aliasing distortional components. However, in the situation where unnecessary signal components generated by the scanning line intermittent extraction effected in the subsampling circuit 3 and the time-axis conversion effected in the converting circuit 4 remain in the region situated on the outside of the aforesaid straight line and close thereto on the above mentioned coordinate plane regarding the received narrow band picture signal, those unnecessary signal components are displayed as noises on the display equipment 8 which has a wideband performance prepared for displaying the high quality picture signal with a result of lowered quality of the displayed picture.

In the picture signal processing apparatus as shown in FIG. 1 according to the present invention, for preventing the above-mentioned undesired result, the reproduced quasi high quality picture signal is applied to the display equipment 8 through the multi-dimensional spatio-temporal low-pass filter 7b being similar to the spatio-temporal filter 2 provided at the sending end, so as to remove the above mentioned unnecessary signal components therefrom.

Nextly, the picture signal processing through the multi-dimensional low-pass filter according to the present invention will be explained by referring to FIGS. 3 and 4 hereinafter.

Figure 4:
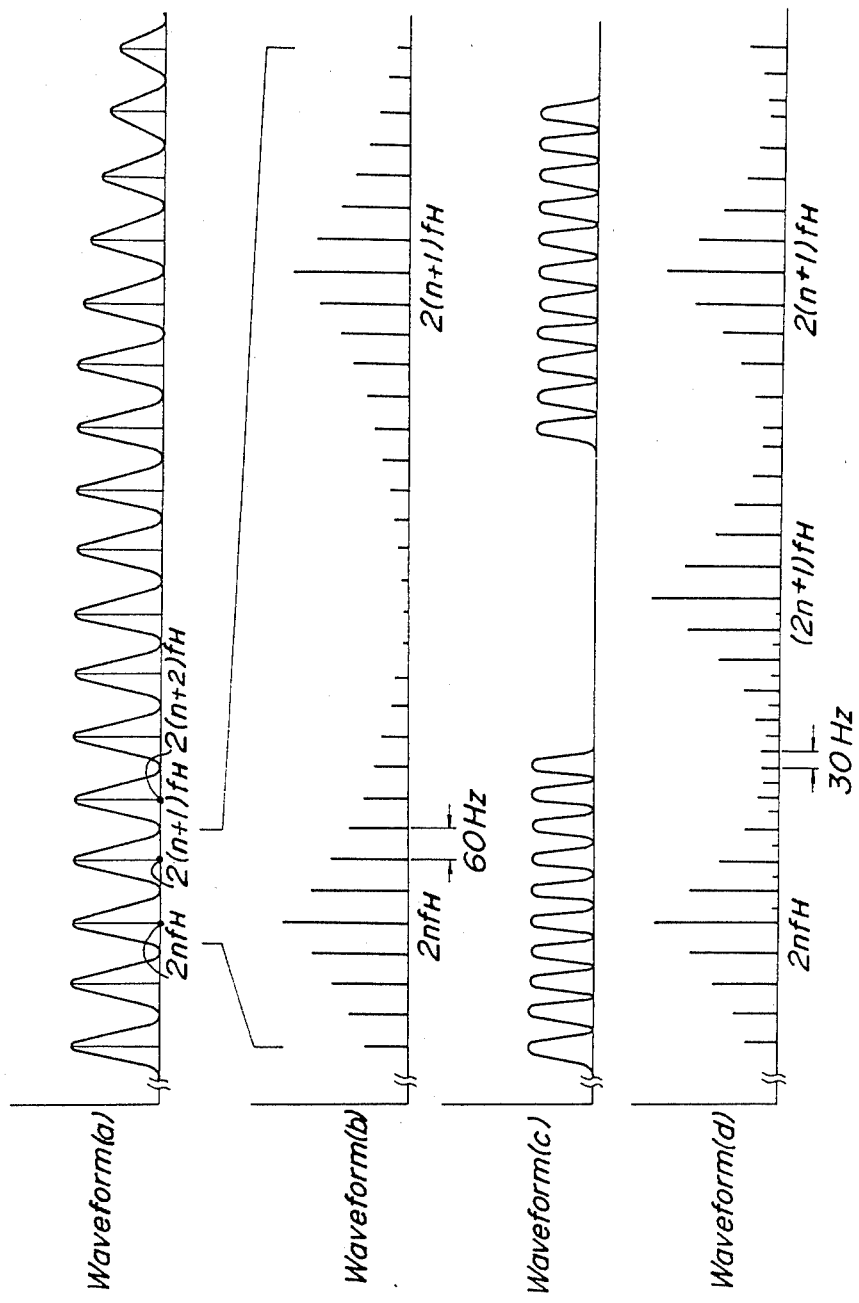
FIG. 4 is a diagram showing examples of signals arranged at various portions of the configuration as shown in FIG. 1.

In the situation where the line-sequential scanning wideband picture signal derived from the television camera 1 of 525 lines, 60 frames per second system has the signal waveform (a) as shown in FIG. 3, when it consists of a still picture signal having no picture motion, the picture frequency spectrum is distributed, as is apparent from the waveform (a) in FIG. 4, such as spectra along the horizontal frequency axis are arranged at frequency points corresponding respectively to multiples of the horizontal scanning frequency $2f_H$ and spectra along the vertical frequency axis are arranged at frequency points corresponding respectively to multiples of the vertical scanning frequency $f_v$, groups of which vertical frequency points are centered respectively by the above horizontal frequency points. An enlarged part of this horizontal and vertical frequency spectrum distribution is shown by the waveform (b) in FIG. 4.

The horizontal scanning frequency of the above exemplified wideband picture signal (a) is twice of the conventional horizontal scanning frequency $f_H$, that is, $2f_H$. On both sides of a certain horizontal frequency axis spectrum $2nf_H$ (n=1, 2, . . . ), side band components thereof consisting of the group of the vertical frequency axis spectra is arranged at frequency interval of the frame frequency $f_v = 60$ Hz.

The wideband picture signal (a) having the above mentioned signal spectrum distribution is applied to the two-dimensional or the three-dimensional spatio-temporal filter 2, which removes the higher region component on the outside of the straight line extended through the frequency points $f_{vo}/2$, O) and (O, $f_F/2$) from the proper signal spectrum region as mentioned above. As a result, regarding the group of vertical frequency axis components which is centered by a certain horizontal frequency axis component $2nf_H$, a part of higher frequency components is removed therefrom, as shown by the waveform (c) in FIG. 4, so that the spatio-temporal filter 2 presents a comb filter performance, a pass band of which is centered by the horizontal frequency axis component $2nf_H$.

The wideband picture signal (a) derived from the spatio-temporal filter 2 having the above mentioned comb filter performance is applied to the subsampling circuit 3, so as to be applied with the so-called subsampling, namely, the thinning for extracting every other one line components of the picture signal, as shown by the waveform (b) in FIG. 3. As a result, although the whole frequency band is substantially unchanged, the horizontal scanning frequency thereof is reduced to a half of the original frequency. The wideband picture signal derived from the subsampling circuit 3 is applied to the time axis converting circuit 4, so as to expand the time axis thereof to two fold. As a result, the whole frequency band thereof is reduced to a half corresponding to the conventional interlace scanning narrow band picture signal of standard system consisting of 525 lines, 60 fields and 30 frames per second.

Consequently, in this situation where the frequency is reduced to half with respect to the horizontal frequency axis component $2nf_H$ of the wideband picture signal spectrum as shown by the waveform (b) in FIG. 4, as well as the whole frequency band is reduced to half, the resultant narrow band picture signal spectrum consists of, as shown by the waveform (d) in FIG. 4, horizontal frequency axis components arranged at frequency intervals $f_H$ corresponding to the conventional horizontal scanning frequency and vertical frequency axis components arranged symmetrically on both sides of each horizontal frequency axis component at frequency intervals 60 Hz corresponding to the conventional field frequency. So that, when the wideband picture signal having the above mentioned waveform (b) as shown in FIG. 4 is straightforwardly processed by the subsampling and the time-axis conversion, as is apparent from the waveform (d) in FIG. 4, two groups of vertical frequency axis components, which are centered respectively by horizontal frequency axis components $2nf_H$ and $(2n+1)f_H$, are alternately intermixed with each other. As a result, for instance, vertical frequency axis components of 30 Hz are newly arranged between horizontal frequency axis components $2nf_H$ and $(2n+1)f_H$, as shown by the waveform (d) in FIG. 4, so that the resultant distortion corresponding to the sampling aliasing distortion as mentioned earlier by referring to FIG. 2 causes the deterioration of the picture quality.

However, in the situation where spectrum components arranged at a central portion between adjacent horizontal frequency axis components $2nf_H$ and $(2n+1)f_H$ in the wideband picture signal as shown by the waveform (b) in FIG. 4 are previously removed through the spatio-temporal filter 2 having a comb filter performance regarding either one of those two horizontal frequency axis components as shown by the waveform (d) in FIG. 4, the above mentioned distortion based on those intermixed vertical frequency axis components is not generated at all. In other words, vertical frequency axis components in the spectrum distribution as shown by the waveform (b) in FIG. 4 are restricted to lower than $f_{vo}/2$ by the spatio-temporal filter 2, so that the converted interlace scanning narrow band picture signal is equivalently prevented from the aforesaid sampling aliasing distortion and, as a result, the high quality picture signal can be reproduced.

In this connection, in the situation where the wideband picture signal (a) is a motional picture signal, although it is described above as the still picture signal, the position of target in the picture is varied respectively in successive frames. So that, the time interval at which the same point of the target appears successively in successive fields becomes different from the vertical scanning interval, and, as a result, frequency positions of the vertical frequency axis components arranged at intervals 60 Hz in the waveform (b) in FIG. 4 are mutually shifted.

When the motion of the target becomes larger, the shift of the above frequency positions are enlarged, so that disturbing frequency components having frequencies different from the 30 Hz as shown in FIG. 4 are generated by the intermixing between adjacent groups of largely shifted vertical frequency axis components as mentioned above, and, as a result, the correlation between adjacent fields of the converted interlace scanning narrow band picture signal is extensively reduced, so that the quality of the reproduced motional picture signals is seriously deteriorated by the occurrence of flicker, the lost natural motion of target and the like.

However, in the situation where the wideband picture signal (a) in which the distribution of the vertical spatial frequency component is widened as mentioned above is processed through the spatio-temporal filter 2 having the comb filter performance as shown by the waveform (c) in FIG. 4, the above mentioned disturbing frequency components based on the shifted vertical spatial frequency components are removed equivalently by restricting the temporal frequency components appearing on the three-dimensional coordinates as shown in FIG. 2 to lower than $f_F/2$, so that the wideband motional picture signal can be effectively prevented from the usual deterioration of picture quality. Consequently, the functional effect of the filter having the duplicated comb filter performance as shown by the waveform (c) in FIG. 4 corresponds to that of the spatio-temporal filter having the proper picture signal spectrum region restricted by the straight line passing through the frequency points ($f_{vo}/2$, O) and (O, $f_F/2$) as shown in FIG. 2.

In the above explanation of the picture signal processing according to the present invention, similarly as the sequential scanning wideband picture signal of 525 lines and 60 frames per second system is converted into the interlace scanning narrow band picture signal of 525 lines, 60 fields and 30 frames per second system, the sequential scanning picture signal is converted to the 2:1 interlace scanning picture signal by extracting every other lines of the original picture signal.

Similarly as mentioned above, when the sequential picture signal is converted to a 3:1, 5:1 and so on interlace scanning picture signal, the similar picture signal processing can be effected by extracting every third, every fifth and so on lines of the original picture signal.

In addition, when the sequential scanning picture signal is converted to a dot-interlace scanning picture signal, the similar picture signal processing can be effected by extracting, for instance, every other or every third samples of the original picture signal sampled at a sampling frequency being higher, for instance, hundreds times of the horizontal scanning frequency. In these additional situations, the three-dimensional spatio-temporal filter based on the three-dimensional coordinates including the horizontal frequency axis can be employed similarly as mentioned above.

Figure 5:
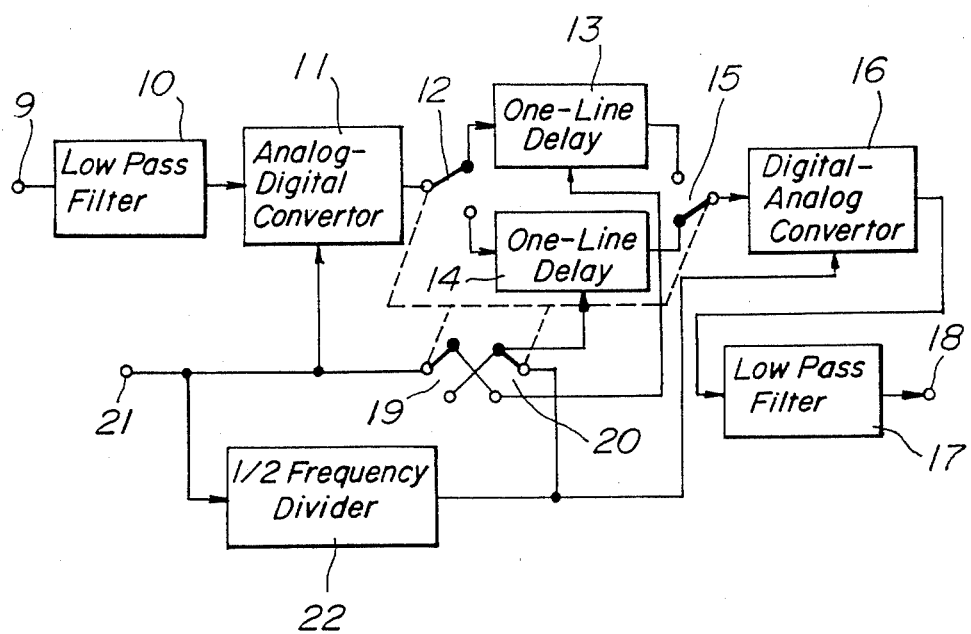
FIG. 5 is a block diagram showing an example of a detailed configuration of a time axis converting circuit consisting in the basic configuration as shown in FIG. 1.

Next, an example of detailed configuration of the time-axis converting circuit 4 consisting in the basic configuration, as shown in FIG. 2, of the picture signal processing apparatus according to the present invention is shown in FIG. 5. In this exemplified time-axis converting circuit, the intermittently extracted wideband picture signal as shown by the waveform (b) in FIG. 3 is applied to an input terminal 9, while a sampling clock signal employed for digitizing the picture signal is applied to another input terminal 21. The intermittent picture signal (b) derived from the input terminal 9 is applied, through a low-pass filter for removing unnecessary frequency components, to an analog-digital converter 11 driven by the clock signal applied from the input terminal 21, so as to be converted to an intermittent digital picture signal. This intermittent digital picture signal derived from the A-D converter 11 is alternately applied through a change-over switch 12 to one-line delays 13 and 14 having one-line memory capacity respectively, so as to be alternately written thereinto under the control of the clock signal applied thereto through a change-over switch 19. Those one-line delays 13 and 14 are alternately applied through a change-over switch 20 also with a low speed clock signal having a one-half clock frequency, which is derived from a ½ frequency divider 20 applied with the original clock signal from the input terminal 21, so as to alternately read-out therefrom one-line picture signals alternately written in as mentioned above under the expansion of time axis. Those alternately read-out one-line picture signals, which are converted into a narrow band digital picture signal as shown by the waveform (c) in FIG. 3 under the processing through a change-over switch 15, are applied to a digital-analog converter 16. A narrow band analog picture signal derived from the D-A converter 16 is applied to an output terminal 18 as a resultant time axis converted picture signal through another low-pass filter 17 for removing unnecessary frequency components also. In this connection, all of the change-over switches 12, 15, 19 and 20 are actuated in connection with each other, and, as a result, while a one-line picture signal is written into either one of those one-line delays 13 and 14 under the control of the original high-speed clock signal, an immediately preceding one-line picture signal is read out from the other one of those one-line delays 13 and 14 under the control of the divided low-speed clock signal.

Additionally speaking, in the configuration of the time-axis converting circuit as shown in FIG. 5, when the wideband picture signal applied to the input terminal 9 is already digitized, the analog-digital converter 11 can be omitted, and further, in the situation where the signal processing in the succeeding stage is effected in the digital form, the digital-analog converter 16 can be omitted also.

The resultant picture signal as shown by the waveform (c) in FIG. 3, which is derived from the time-axis converting circuit 4 simply applied with the subsampled picture signal, has a signal form being similar as an interlace scanning picture signal derived from a conventional television camera.

In the picture signal processing system according to the present invention, which is different from the above mentioned, the generation of the so-called aliasing distortion component is prevented by applying the three-dimensional spatio-temporal filtering to the wideband picture signal by the spatio-temporal filter 2 prior to the above mentioned signal processing.

Next, the three-dimensional spatio-temporal filter representing the above mentioned feature of the picture signal processing system according to the present invention, particularly, a filter performance and a concrete configuration for realizing this performance will be described hereinafter.

First, for defining the three-dimensional filter performance, the analysis thereof will be effected under the approximation that a picture signal, particularly, a television signal, has been sampled with respect to the space in two dimensions of horizontal and vertical directions by horizontal and vertical scannings respectively as well as sampled with respect to the temporal direction. The sampling frequency for the spatial two-dimension sampling consists of the horizontal and the vertical scanning frequencies. For instance, in the sequential scanning system, the vertical direction sampling frequency $f_{vo}$ corresponds to the frame frequency, namely, a reciprocal of the line number $L_n$, that is to say, $f_{vo} = 1/L_n$. On the other hand, the horizontal direction sampling frequency $f_{uo}$ is based on the horizontal direction sampling of the picture signal for converting an analog picture signal to a digital picture signal, so that it is presented in a form of spatial frequency by the multiplication product between the quotient of the sampling frequency divided by the horizontal scanning frequency and the aspect ratio, for instance, 3:4, that is, ¾ for the standard television system. For instance, when the sampling frequency for the analog-digital conversion is denoted by $f_s$, this product $f_{uo}$ becomes $$f_{uo} = (f_s/f_H) \times \tfrac{3}{4}.$$

Furthermore, the sampling frequency $f_{to}$ in the temporal frequency axis direction corresponds to the number $F_N$ of frames per second, because the temporal variation based on the motion of the picture appears per unit time.

In the situation where each sampling frequencies regarding each axes of the three-dimensional coordinates for defining the three-dimensional filter performance are defined as mentioned above, the signal spectrum distribution presented by the picture signal of sequential scanning system in the spatio-temporal frequency region of the three-dimensional coordinates can be defined according to the discrete Fourier conversion, that is, the so-called DFT method. On the other hand, regarding the picture signal of interlace scanning system, which system can be regarded as the sampling of a kind different from that in the sequential scanning system, the signal spectrum distribution can be defined also according to the DFT method.

In addition, under the condition that sampling frequencies in each axis directions of the three-dimensional coordinates, for instance, regarding the 2:1 interlace scanning system are defined, for instance, by halving those regarding the sequential scanning system, the signal spectrum distribution of the picture signal in the three-dimensional coordinates can be defined according to the same operation method.

Moreover, it is possible on the basis of these sampling frequencies as mentioned above to predict what kind of aliasing distortion component may be generated, and further it is possible also on the basis of this prediction to clarify a picture signal spectrum distribution required for preventing the intermixing therewith of the aliasing distortion component.

Figure 7:
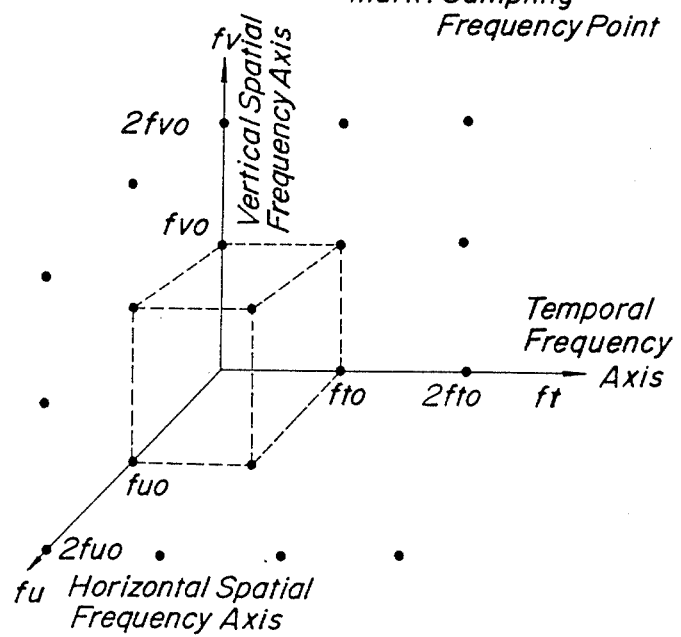

The sampling frequencies on the horizontal and the vertical spatial frequency axes and the temporal frequency axis of the three dimensional coordinates regarding the line-sequential scanning picture signal are defined respectively by the frequency points $f_{uo}$, $f_{vo}$ and $f_{to}$ and the harmonics points thereof $2f_{uo}$, $2f_{vo}$ and $2f_{to}$ in combination with each other as shown by black spots in FIG. 7.

In this connection, as mentioned earlier by referring to FIG. 2, it is usual that the sampling of the picture signal is not effected along the horizontal spatial frequency axis, and further any variation does not appear along this horizontal spatial frequency axis in the scanning conversion thereof between the sequential system and the line-interlace system. Accordingly, for investigating the difference of signal spectrum distribution between those two scanning systems, it is sufficient to investigate the signal spectrum distribution on the two-dimensional coordinates consisting of the vertical spatial frequency axis and the temporal frequency axis.

The sampling frequencies on this two-dimensional coordinates regarding the line-interlace scanning picture signal are defined respectively by the frequency points $\frac{1}{2}f_{vo}$ and $\frac{1}{2}f_{to}$ and the harmonics points $f_{vo}$ and $f_{to}$ in combination with each other as shown by black spots in FIG. 8.

As is apparent from the comparison between FIGS. 7 and 8, regarding the line-interlace scanning system, new sampling frequencies are defined by the new frequency points $\frac{1}{2}f_{vo}$ and $\frac{1}{2}f_{to}$ in addition to those regarding the sequential scanning system. So that, in the situation where the sequential scanning wideband picture signal is converted to the line-interlace scanning narrow band picture signal according to the signal processing including the subsampling as mentioned earlier by referring to FIG. 1, the above new sampling frequency points $\frac{1}{2}f_{vo}$ and $\frac{1}{2}f_{to}$ in combination with each other defined a new imaginary origin $O_s$ and the signal spectrum distribution of the sequential scanning wideband picture signal is previously restricted within a region including the proper origin O bounded by a boundary line situated equally apart from the proper origin O and the above new imaginary origin $O_s$, that is, a straight line passing through those new sampling frequency points $\frac{1}{2}f_{vo}$ and $\frac{1}{2}f_{to}$.

As a result of the above restriction of the picture signal spectrum distribution region, it is possible to prevent the deterioration of picture quality caused by the intermixing of the aliasing distortion component with the proper picture signal spectrum distribution in the conversion between the sequential scanning wideband picture signal and the line-interlace scanning narrow band picture signal, as shown by shading in FIG. 8.

FIG. 8 shows the restricted region of the signal spectrum distribution in the situation where the sequential scanning wideband picture signal is converted to the 2:1 line-interlace scanning narrow band picture signal, in which region the imaginary origin $O_s$ is denoted by $O_{s2}$ for distinguishing the above situation of the 2:1 interlace scanning from other situations of different ratio interlace scanning. In FIG. 8, only the first quadrant relating to the vertical frequency axis and the temporal frequency axis is shown. So that, in consideration of all quadrants relating to those two axes, the whole restricted region of the picture signal spectrum distribution becomes a square or a rectangle formed of four shaded right-angled triangles as shown in FIG. 8. Accordingly, it is possible that the aliasing component spectrum distribution region centered by the imaginary origin $O_{s2}$ becomes also substantially the same square of rectangle, which substantially corresponds to the visual rhombic region as shown in FIG. 2.

Figure 9B:
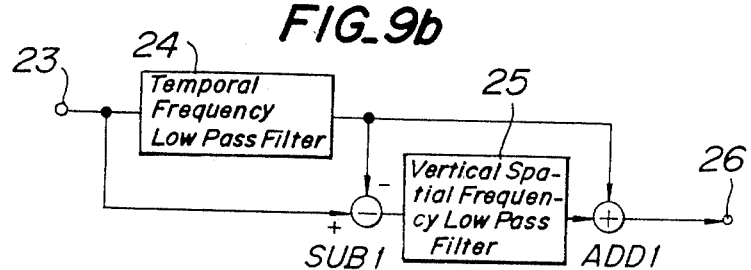

For realizing the two-dimensional low-pass filter regarding the vertical frequency and the temporal frequency axes which has a pass band consisting of the above restricted signal spectrum distribution region, a two-dimensional low-pass filter, which has an equivalent pass band consisting of a shaded region in FIG. 9(a) and an exemplified configuration of which is shown in FIG. 9(b), can be preferably provided.

The two-dimensional low-pass filter composed as shown in FIG. 9(b) is formed of a temporal frequency and vertical spatial frequency low-pass filters 24 and 25 which are combined with a subtracter SUB1 and an adder ADD1. The temporal frequency low-pass filter 24 has a pass band consisting of a shaded region an upper limit of which is a point α on the temporal frequency axis $f_t$ as shown in FIG. 9(a), while the vertical spatial frequency low-pass filter 25 which is applied with the input picture signal subtracted from the pass band component of the temporal frequency low-pass filter 24 therefrom, has a pass band consisting of a shaded region a lower limit of which is the same point α on the temporal frequency axis $f_t$ as shown in FIG. 9(a) also. The two-dimensional filter output picture signal having a pass band consisting of the whole shaded region as shown in FIG. 9(b) can be derived from the output terminal 26 through the adder a ADD1 in which filtered output signals respectively derived from those filters 24 and 25 are added to each other.

In this connection, the shaded passing region as shown in FIG. 8 is approximated by a comparatively simple form in FIG. 9(a). However, for approximating this shaded passing region as shown in FIG. 8 more accurately and more precisely, it is possible to compose a two-dimensional low-pass filter, which has a pass band consisting of a shaded region of FIG. 10(a), as shown in FIG. 10(b).

Figure 10B:
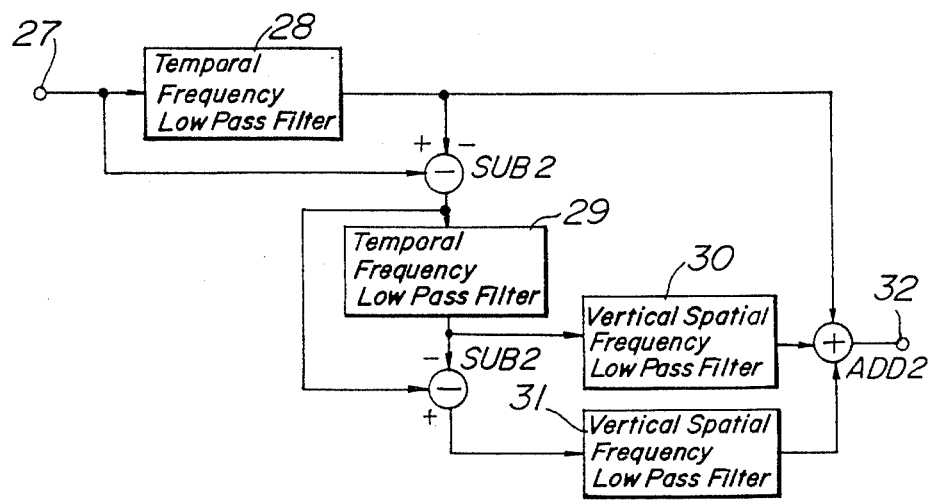

The two-dimensional low-pass filter composed as shown in FIG. 10(b), similarly as that shown in FIG. 9(b), is formed of a combination of two temporal frequency low-pass filters 28 and 29, pass bands of which consist respectively of shaded regions, upper limits thereof respectively being points $\alpha_1$ and $\alpha_2$ on the time axis and two vertical spatial frequency low-pass filters 30 and 31, pass bands of which consist respectively of shaded regions, upper limits thereof respectively being points $\beta_1$ and $\beta_2$ on the vertical frequency axis through two subtractors SUB2, SUB3 and an adder ADD2.

Next, an example of a concrete configuration of the temporal or the vertical spatial frequency low-pass filter used for composing the two-dimensional filter is shown in FIG. 11. This exemplified low-pass filter corresponds to a so-called transversal filter consisting of successively cascade connected plural delay elements 34, plural weighting multiplier 35 which are connected with inputs and outputs of those delay elements 34 respectively and an adder ADD6 for adding output signals of those weighting multipliers 35 to each other. Those delay elements 34 consist respectively of one-frame memories in the temporal frequency axis direction low-pass filter, while those delay elements 34 consist respectively of one-line memories.

Next, FIG. 12 shows restricted regions of the signal spectrum distribution in the situation where the sequential scanning wideband picture signal is converted to the 3:1 line-interlace scanning narrow band picture signal, similarly as FIG. 8 regarding the conversion to the 2:1 line-interlace scanning narrow band picture signal. As is apparent from FIG. 12, new sampling frequency points newly generated in the conversion to the 3:1 line-interlace scanning narrow band picture signal appear at black spots $O_{s3}$ and $O'_{s3}$ as shown in FIG. 12, which correspond respectively to frequency points $3/3f_{vo}$, $\frac{2}{3}f_{vo}$ and $\frac{1}{3}f_{to}$, $\frac{2}{3}f_{to}$ as defined in relation to the interlace ratio 3:1. Accordingly, regarding the restricted signal spectrum distribution region in the conversion to the 3:1 interlace scanning picture signal, similarly as in the conversion to the 2:1 interlace scanning picture signal as shown in FIG. 8, the above mentioned frequency points $O_{s3}$ and $O'_{s3}$ are respectively regarded as imaginary origins and a boundary line situated equally apart from those imaginary origins $O_{s3}$, $O'_{s3}$ and the proper origin O is obtained. As a result, the necessary restricted distribution region in the first quadrant becomes a part of a regular octagon centered by the proper origin O as shown by shading in FIG. 12, as well as aliasing distortion component spectrum distribution regions respectively centered by those imaginary origins $O_{s3}$ and $O'_{s3}$ become substantially similar regular octagons as the same.

Next, FIG. 13 shows restricted regions of the signal spectrum distribution in the situation where the sequential scanning wideband picture signal is converted to the 4:1 line-interlace scanning narrow band picture signal, similarly as FIG. 12 regarding the conversion to the 3:1 line-interlace scanning narrow band picture signal. As is apparent from FIG. 13, new sampling frequency points newly generated in the conversion to the 4:1 line-interlace scanning narrow band picture signal appear at black spots $O_{s4}$, $O'_{s4}$ and $O''_{s4}$ as shown in FIG. 13, which correspond respectively to frequency points $\frac{1}{4}f_{vo}$, $\frac{1}{2}f_{vo}$, $\frac{3}{4}f_{vo}$ and $\frac{1}{4}f_{to}$, $\frac{1}{2}f_{to}$, $\frac{3}{4}f_{to}$ on respective axes as defined in relation to the interlace ratio 4:1. Accordingly, regarding the restricted signal spectrum distribution region in the conversion to the 4:1 interlace scanning picture signal, similarly as in the conversion to the 3:1 interlace scanning picture signal as shown in FIG. 12, the above mentioned frequency points $O_{s4}$, $O'_{s4}$ and $O''_{s4}$ are respectively regarded as imaginary origins and a boundary line situated equally apart from those imaginary origins $O_{s4}$, $O'_{s4}$, $O''_{s4}$ and the proper origin O is obtained. As a result, the necessary restricted distribution region in the first quadrant becomes a part of an irregular dodecagon centered by the proper origin O as shown by shading in FIG. 13, while aliasing distortion component spectrum distribution regions respectively centered by those imaginary origins $O_{s4}$, $O'_{s4}$ and $O''_{s4}$ become substantially similar irregular dodecagons as the same. So that, similarly as mentioned above by referring to FIGS. 9 to 11, the necessary two-dimensional low-pass filter can be realized.

In this connection, as is apparent from the deduction mentioned above, in the situation where the interlace ratio is further increased, similarly as mentioned above, new sampling frequency points adjacent to the necessary restricted signal spectrum distribution region appear on the straight line passing through the frequency point $\frac{1}{2}f_{vo}$ on the vertical frequency axis and the frequency point $\frac{1}{2}f_{to}$ on the time axis. As a result, the necessary restricted signal spectrum distribution region can be obtained similarly as mentioned above by referring to FIGS. 12 and 13 and further a required two-dimensional low-pass filter having a pass band consisting of the above restricted signal spectrum distribution region can be composed. Consequently, even for the conversion to the various ratio interlace scanning picture signal, the picture quality deterioration caused by the aliasing distortion component can be prevented.

The above mentioned restricted signal spectrum distribution region according to the present invention for preventing the intermixing of the aliasing distortion component can be applied to the scanning conversion from the sequential scanning wideband picture signal to the dot-interlace scanning picture signal similarly for the scanning conversion to the above line-interlace scanning picture signal. An exemplified restricted signal spectrum distribution region in this situation is shown in FIGS. 14 and 15.

In this situation also, similarly as the above mentioned various situations, a new sampling frequency point based on the scanning conversion for grouping every other picture elements of a picture composed by the sequential scanning into two groups, as shown by denoting with two kinds of marks o and x, so as to effect the 2:1 dot-interlace scanning, appears at a diagonal apex "h" opposite to the coordinate origin "O" on a cube "a b c d e f h o" formed on the basis of apexes "c, a and e", which correspond respectively to frequency $\frac{1}{2}f_{uo}$, $\frac{1}{2}f_{vo}$ and $\frac{1}{2}f_{to}$ respectively defined by the dot-interlace ratio 2:1 on the horizontal frequency, the vertical frequency and the temporal frequency axes of the three-dimensional coordinates, as shown in FIG. 15. As a result, a restricted signal spectrum distribution region defined according to the consideration similar to that regarding the scanning conversion to the line-interlace scanning becomes a region defined by segmental lines passing through the apexes "a, b, c, d, e, f and o" and a crossing point "g" of diagonals of the above mentioned cube.

For realizing a three-dimensional low-pass filter having a pass band consisting of the above complicated restricted signal spectrum distribution region, this complicated restricted region is approximated by a comparatively simple solid region as shown in FIG. 16(a), so as to attain a substantially similar functional effect of low-pass filtering.

Further, for realizing another three-dimensional low-pass filter having a pass band consisting of the above solid region, this three-dimensional filter can be composed similarly as the two-dimensional filter as shown in FIG. 9(b), which has the pass band consisting of the temporal frequency region and the vertical spatial frequency region, these different direction regions being obtained by resolving the complicated restricted region as shown in FIG. 9(a). That is, this three-dimensional low-pass filter can be comparatively simply composed, as shown in FIG. 16(b), by combining a temporal frequency low-pass filter 38, a vertical spatial frequency low-pass filter 39 and a horizontal spatial frequency low-pass filter 40 together with subtractors SUB4, SUB5 and an adder ADD4.

In this connection, for improving the accuracy of the above approximation of the pass band required as shown in FIG. 16(a) for the three-dimensional low-pass filter which is composed as shown in FIG. 16(b), it is possible that, as shown in FIG. 16(c), respective pass bands of two three-dimensional low-pass filters 43, 44, which are composed approximately as shown in FIG. 16(b), are slightly shifted to each other and then these two filters 43, 44 are combined with each other through subtracters SUB6, SUB7, so as to approximate a resultant composite pass band more closely to the required pass band as shown in FIG. 15.

In addition, the manner of composition of the three-dimensional low-pass filter for the conversion to the 2:1 dot-interlace scanning picture, similarly as mentioned earlier regarding the line-interlace scanning system, can be applied to the further increased ratio dot-interface scanning system.

In the picture signal processing apparatus as shown in FIG. 1 according to the present invention, as mentioned earlier, the line-interlace scanning wideband picture signal (a), the bandwidth of which is appropriately restricted through the multi-dimensional low-pass filter 2, is converted to the line-interlace scanning picture signal (c) through the subsampling circuit 3 and the time axis converting circuit 4 as mentioned by referring to FIG. 3. This converted narrow band picture signal (c) is transmitted in a form of carrier signal converted through a modulator 5 and restored into an original signal form through a demodulator 6 at the receiving end. In this connection, the modulator 5 and the demodulator 6 used for the transmission can be composed in an analog or a digital form and further similarly as conventional equipments.

At the receiving end, the restored narrow band picture signal (c) is applied to a time-axis converting circuit 7a, in which the time axis thereof converted by the time-axis converting circuit 4 at the sending end is restored to the original state, so as to reproduce the wideband intermittent picture signal as shown by the waveform (b) in FIG. 3, and further the reproduced intermittent picture signal (b) is appropriately interpolated, so as to obtain a quasi sequential scanning wideband picture signal. This quasi wideband picture signal is situated in a state such as the prevention against the picture quality deterioration caused by the aliasing distortion component has been effected through the spatio-temporal filter 2, and thereafter further unnecessary components have been intermixed through the subsampling circuit 4 and the above time-axis converting circuit 7a outside the restricted signal spectrum distribution region thereof. Consequently, this quasi wideband picture signal is applied to a three-dimensional low-pass filter 7b which has the same performance as the filter 2 at the sending end, so as to remove the above intermixed unnecessary components therefrom. The resultant high quality sequential scanning wideband picture signal can be displayed on a display equipment 8.

In this connection, for simplifying and economizing the receiving apparatus, it is possible to simplifying the configuration of the three-dimensional low-pass filter 7b also. However, it is required also for this simplification that the lower sampling frequency components generated by sampling the picture signal, aliasing distortion components distributed, for instance, in the aliasing component region centered by the sampling frequency point $O_s$ as shown in FIG. 8 or in the aliasing component regions centered respectively by the sampling frequency points $O_{s3}$, $O'_{s3}$ as shown in FIG. 12 are sufficiently suppressed enough such as those distortion components are hardly detected noticeably in the displayed picture.

In addition, thereto, it is possible that the time-axis converting circuit 7a and the three-dimensional low-pass filter 7b are exchanged with respect to each other at the receiving end, so as to previously effect the three-dimensional filtering on the narrow band picture signal for removing the unnecessary sampling frequency components generated in connection with the time-axis conversion therebefore, and thereafter to effect the time-axis reconversion on this line-interlace scanning narrow band picture signal.

An example of an essential portion of the above modified arrangement in the situation where the 2:1 line-interlace scanning picture signal is converted to the sequential scanning picture signal is shown in FIG. 17.

In the configuration as shown in FIG. 17, the line-interlace scanning narrow band picture signal 46 derived from the demodulator 6 as shown by the waveform (c) in FIG. 3 is directly applied to a three-dimensional low-pass filter 50 as a non-delay picture signal 52, as well as applied thereto through a combination of two one-field memories 47, 48 and a half-line memory 49 respectively as a one-frame delayed picture signal 53 and a one-field and half-line delayed picture signal 54, so as to effect the aforesaid restriction of the signal spectrum distribution region on those picture signals, as well as to previously form an interpolating signal on the basis of the one-field and half-line delayed picture signal, as shown successively by waveforms in FIG. 18, for interpolating an intermittent picture signal as shown by the waveform (b) in FIG. 3 which is formed thereafter by a succeeding time-axis converting circuit 51.

Further speaking in detail, as shown by the successive waveforms in FIG. 18, intermittent line picture signals successively denoted by scanning line numbers $i_1+1$, $i_1+3$, $i_1+5$, . . . in the one-field and half-line delayed picture signal 54 are applied to the time-axis converting circuit 51 as those are, as a group 55 of every other line picture signals successively denoted by $i_1+1$, $i_1+3$, $i_1+5$, . . . in the time-axis converted picture signal, as well as a weighted combination of intermittent line picture signals successively denoted by $i_0$, $i_0+2$, $i_0+4$, . . . in the non-delay picture signal 52 and intermittent line picture signals successively denoted by $i_2$, $i_2+2$, $i_2+4$, . . . in the one-frame delayed picture signal 53 is applied to the time-axis converting circuit 51 as an interpolating picture signal 56 for supplementing another group of every other line picture signals successively denoted by $i_1$, $i_1+2$, $i_1+4$, . . . , which was previously omitted by the subsampling circuit 3 at the sending end. In this connection, among those mutually interpolating output picture signals 55 and 56, lower range components of the former are extracted through a vertical spatial frequency low-pass filter, as well as higher range components of the latter are extracted through a vertical spatial frequency high-pass filter. Those lower range and higher range components of the mutually interpolating output picture signals can be employed also for supplementing the above mentioned omitted line picture signals $i_1$, $i_1+2$, $i_1+4$, . . . . Moreover, since all of the input picture signals of the three-dimensional low-pass filter 51 take a signal form of narrow band picture signal as shown by the waveform (3) in FIG. 3 in the configuration as shown in FIG. 17, the speed of signal processing in the three-dimensional filter 50 can be lowered to half of that in the three-dimensional filter 7b in the configuration as shown in FIG. 1, and, as a result, the composition of the three-dimensional filter 50 can be favorably facilitated.

Figure 19B:
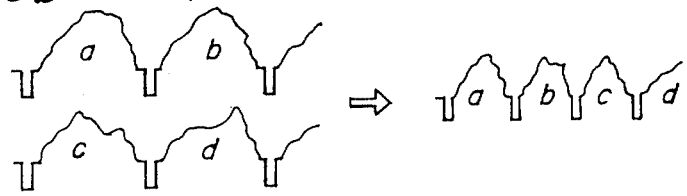

The line-interlace scanning narrow band picture signal before or after the interpolating and filtering process as mentioned above is applied to the time-axis converting circuit 51 or 7a, so as to convert the time-axis thereof as well as interpolate scanning lines thereof, and, as a result, it is converted to the line-sequential scanning wideband picture signal. An example of configuration of the time-axis converting circuit for effecting the above time-axis conversion is shown in FIG. 19(a) and the behavior of time-axis compression and interpolation thereby is shown by waveforms in FIG. 19(b). In the exemplified time-axis converting circuit as shown in FIG. 19(a), an odd line and an even line picture signals 57 and 58 corresponding respectively to the mutually interpolating output picture signals 55 and 56 derived from the three-dimensional low-pass filter 50 are alternately written into two paired one-line memories 63-1, 63-2 and 63-3, 63-4 at a low speed through a double pole and double throw changeover switch 59, as well as alternately read out from those pairs at a high speed through another double pole and double-throw changeover switch 60, and further alternately changed over through a single pole and double throw switch 61. Consequently, as shown in FIG. 19(b), two series of odd-line picture signals a, b, ... and c, d, ..., which are read out at the high speed, are alternately derived from the switch 61, so as to obtain the sequential scanning wideband picture signal consisting of those successive line picture signals a, c, b, d, ... at an output terminal 62.

The high speed sequential scanning wideband picture signal obtained by the aforesaid interpolating and filtering process and the aforesaid time-axis conversion is applied to the display equipment 8 formed of, for instance, a conventional cathode ray tube, so as to display a high quality picture which is sufficiently prevented from the quality deterioration caused by the intermixing of the aliasing distortion component in company with the scanning conversion.

Next, for simplifying the configuration as shown in FIG. 1 of the picture signal processing apparatus in which the picture quality deterioration based on the aliasing distortion component can be prevented according to the present invention, the elements 1, 2, 3 and 4 of the exemplified configuration are substituted by a conventional television camera of 2:1 line-interlace scanning system, so as to apply a standard system television picture signal obtained therefrom to the modulator 5 instead of the low speed line-interlace scanning narrowband picture signal as shown by the waveform (e) in FIG. 3. According to this simplified configuration, the three-dimensional low-pass filtering and the time-axis conversion according to the present invention are effected only at the receiving end. Moreover, according to this simplified configuration, the picture signal applied from the television camera to the modulator 5 is no more than the standard system television picture signal, so that a benefit such as this camera output picture signal can be applied to some other purposes is obtained.

In addition, the picture signal processing of the present invention can be applied to a mono-chrome picture signal as well as a color picture signal. Basically, it can be applied in parallel to each components of the color picture signal, that is, each primary color picture signals R, G, B or a brightness signal Y and color difference signals R-Y, B-Y. However, in this situation, the number of frame memories required at the receiving end can be reduced by effecting the three-dimensional filtering process to be applied to those color component signals at the receiving end as follows.

For instance, in the situation where the high speed sequential scanning color picture signal is transmitted through the process of temporary conversion to the low speed 2:1 line-interlace scanning color picture signal, sampling frequency points concerning the three-dimensional filtering process in the color picture conversion from the sequential system to the 2:1 line-interlace scanning system appear, as mentioned earlier by referring to FIG. 8, at the imaginary origin $O_{s2}$ relating to the frequency point $\frac{1}{2}f_{vo}$ on the vertical frequency axis and the frequency point $\frac{1}{2}f_{to}$ on the temporal frequency axis. However, the color picture signal has a well known feature that the resolution required for color difference signals B-Y, R-Y is extremely low in comparison with that required for the brightness signal Y and further the standard system color television picture signal is formed by positively utilizing this feature.

As a result, for positively utilizing the above feature of the color picture signal, the pass band of the two-dimensional low-pass filter used for the filters 2 and 7b in the configuration as shown in FIG. 1 is defined by a rectangle as shown by a surrounding chain line in FIG. 8, a width of in the vertical frequency axis direction of which is halved, instead of the aforesaid triangle as shown by the surrounding solid line in FIG. 8. A two-dimensional low-pass filter having this pass band can be formed of a combination of frame memories and line memories similarly as mentioned earlier. However, although this two-dimensional low-pass filter can be employed for the pre-filter 2 at the sending end, regarding the interpolation filter 7b at the receiving end, a conventional low-pass filter having a cutoff frequency $\frac{1}{2}f_{vo}$ along the vertical frequency axis only, while any low-pass filter is not provided along the temporal frequency axis, except for a visual low-pass filter usually used for displaying a conventional color television picture signal. As a result, the aliasing distortion can be suppressed in a displayed picture without any deterioration of color picture quality.

In this connection, regarding the color difference signals B-Y, R-Y having particularly low resolutions, the displayed color picture quality is not substantially deteriorated, even though the pass band along the vertical spatial frequency axis is extremely reduced as shown by the chain line in FIG. 8. In contrast, according to the above simplified configuration, a frame memory prepared for the color signal can be omitted. However, the filtering process employing frame memories is effected along the time axis in practice, so that the brightness signal Y is delayed at a rate of frame. Consequently, it is necessary to previously delay the color difference signals B-Y, R-Y by a time corresponding to the above delay before those signals are transmitted to the receiving end.

Next, an example of the configuration of the picture signal processing apparatus provided for applying the picture signal processing of the present invention to a coded picture signal of interframe coding system will be described by referring to FIGS. 20(a) and (b).

Figure 20B:
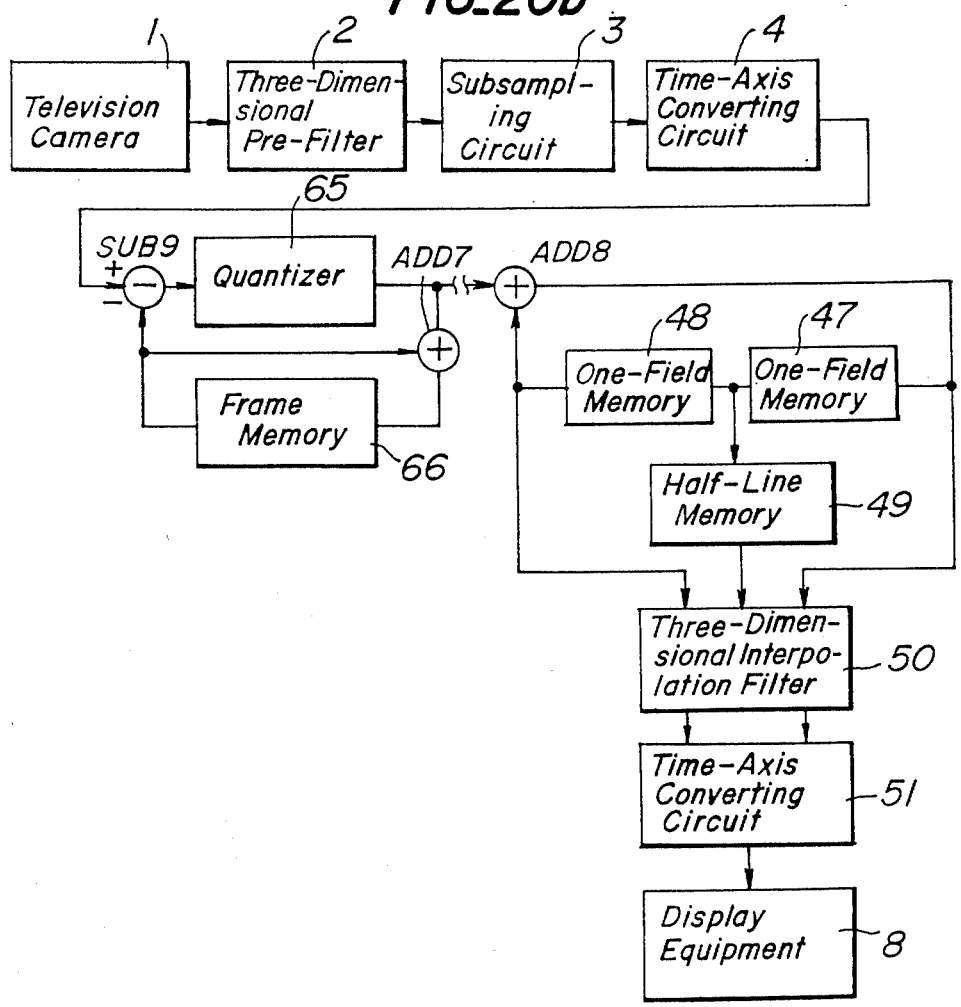

FIG. 20(a) shows a basic configuration of the picture signal coding apparatus, and FIG. 20(b) shows an example of a configuration in which the present invention is applied thereto. That is, in the picture signal coding apparatus of interframe coding system as shown basically in FIG. 20(a), an input analog picture signal 64 is applied to a quantizer 65 through a subtracter SUB8, a quantized picture signal derived therefrom being written into a frame memory 66 through an adder ADD5, a one-frame-delayed quantized picture signal read out therefrom being applied to the adder ADD5, so as to be added to the quantized picture signal derived from the quantizer 65, as well as applied to the subtracter SUB8, so as to be subtracted from the input picture signal, an interframe difference picture signal being applied to the quantizer 65, so as to transmit a coded interframe difference picture signal to a receiving end. At the receiving end, the coded interframe difference picture signal is applied to an adder ADD6, a resultant picture signal derived therefrom being applied to a frame memory 67. This frame memory 67 is applied with an immediately preceding frame picture signal, which is read out therefrom, so as to be applied to the adder ADD6 as a predicted picture signal. This predicted picture signal is added to the input coded interframe difference picture signal, so as to obtain a new one frame picture signal, which is newly written into the frame memory 67. As a result, an output frame picture signal 68 can be succeedingly derived from the ADD6.

On the other hand, in the interframe difference picture signal coding apparatus applied with the picture signal processing system of the present invention as shown in FIG. 20(b), the low speed line-interlace scanning narrow band picture signal as shown by the waveform (c), which is formed at the sending end through the picture signal processing apparatuses 1, 2, 3 and 4 as shown in FIG. 1, is used for the input analog picture signal 64 of the basic configuration as shown in FIG. 20(a). Further, at this receiving end, the frame memory 67 is used for forming the predicted picture signal as well as for composing the three-dimensional interpolation filter 7b in the configuration as shown in FIG. 1. For instance, in the situation where the sequential scanning picture signal is converted to the line-interlace scanning picture signal, this frame memory 67 is divided into two field memories, which are used for the one field memories 47 and 48 in the receiving equipment as shown in FIG. 17.

As a result, the receiving equipment in the basic configuration as shown in FIG. 20(a) is arranged just the same to this receiving equipment as shown in FIG. 17. Consequently, at the end of the above mentioned interframe difference coded picture signal tranmission system also, it is possible to present the deterioration of the reproduced picture quality caused by the intermixing of the aliasing distortion component generated by the coding process according to the application of the three-dimensional interpolation filtering process of the present invention.

In addition, in the situation where the picture signal processing system according to the present invention is applied to a receiving equipment of the so-called still picture broadcast similarly as mentioned above regarding to the interframe difference coded picture signal transmission system, the same functional effect can be obtained. Further speaking in detail, in the still picture broadcasting system, desired one of various still picture signals transmitted successively by one frame is memorized in a frame memory provided at the receiving end thereof, and repeatedly reproduced therefrom. As a result, in the still picture broadcasting system also, the frame memory provided at the receiving end thereof is divided into two field memories, which are used for effecting a picture signal processing similar as effected by the one-field memories 47 and 48 in the receiving equipment as shown in FIG. 17, and, as a result, the reproduction of the high quality picture signal can be easily performed according to the similar three-dimensional interpolation filtering process.

Next, the picture contour compensation effected on three-dimensional picture signal components including the temporal frequency component, so as to improve the sharpness of television picture, according to the picture signal processing of the present invention, will be described hereinafter.

Conventionally, a picture contour compensating circuit composed as shown in FIG. 21 is adopted for improving the sharpness of television picture.

In this configuration, an input picture signal 71 and a two-line delayed picture signal derived from one-line delays 72 and 72', which are connected with each other in series and applied with the input picture signal 71, are applied to a combination of an adder ADD9 and a 6 dB attenuator 73, so as to form an average picture signal, this average picture signal and a one-line delayed picture signal derived from the one line delay 72 being differentially applied to a combination of a subtracter SUB10 and an adjustable attenuator 74, a difference picture signal derived therefrom being added to the above one-line delayed picture signal through an adder ADD10, so as to obtain an output picture signal which is affected by the picture contour compensation regarding the vertical spatial frequency component.

The spatial frequency performance of the above mentioned picture contour compensating circuit becomes as shown in FIG. 22 regarding a television picture signal of standard system in which the 2:1 line-interlace scanning is effected, and particularly on the basis of the application of the one-line delay the vertical spatial frequency performance relating to the number N of scanning lines as shown in FIG. 22 can be obtained.

In addition, the picture contour compensation regarding the horizontal spatial frequency component can be effected by employing delay lines having a delay time of hundred nanoseconds in place of those one-line delays 72, 72' in the above mentioned configuration, such as the resultant horizontal spatial frequency performance is adapted to the above vertical spatial frequency performance, in which the central frequency of the boosted region required for the picture contour compensation is situated at a position N/4 on the vertical spatial frequency axis.

In this connection, the vertical spatial frequency of the television picture signal is normalized by the height of the television picture in FIG. 22, and, regarding the television picture having the number N of scanning lines, the spatial frequency component maximally up to N/2 can be transmitted and reproduced. So that, the central frequency N/4 of the boosted region of the spatial frequency performance for improving the sharpness of television picture according to the conventional picture contour compensating circuit as shown in FIG. 21 is no more than a half of the spatial frequency N/2 which is ideally transmitted and reproduced, with a defect that the sufficient compensation of picture contour cannot be realized.

For raising the central frequency of the boosted region of the vertical spatial frequency performance by removing the above mentioned conventional defect, it is conceivable to employ a one-field delay line in place of the above one-line delay. However, in the situation where the picture contour compensation regarding the vertical spatial frequency is effected by employing the one-field delay line, an extremely intense flicker disturbance is caused in detailed portion of the reproduced picture, and, as a result, the reproduced picture quality is excessively deteriorated against the intention. Moreover, in the conventional television camera, the accumulation effect of the camera tube is utilized for increasing the camera sensitivity, so that, an extensive ambiguity is caused by the motion of the target in the reproduced picture, and, as a result, the reproduced picture quality is excessively deteriorated also.

For solving the various problems mentioned above regarding the contour compensation of the television picture by effecting the picture contour compensation regarding the three-dimensional coordinates including the temporal frequency axis according to the application of the picture signal processing of the present invention, a configuration as shown in FIG. 23 similarly as shown in FIG. 1 should be used.

In a simplified explanation of the configuration as shown in FIG. 23, the sequential scanning picture signal having N scanning lines is applied from the camera 1 to the three-dimensional low-pass filter 2, so as to restrict the signal spectrum distribution region, and applied to the time-axis converting circuit 4, so as to be converted into the 2:1 line-interlace scanning picture signal, which is applied to the modulator 5, so as to be converted into the carrier frequency signal. The pass band required for the three-dimensional low-pass filter 2 becomes the shaded triangular region in FIG. 24, which newly shows the same as shown in FIG. 2. Among the spatial frequency spectrum distribution regions as shown in FIG. 24, the signal spectrum distribution region surrounding the sampling frequency point A by a dotted line is based on the conversion from the sequential scanning picture signal derived from the camera 1 to the 2:1 line-interlace scanning picture signal. However, the camera output picture signal has additionally unnecessary side band frequency spectrum distribution regions which surround respectively other sampling frequency points C, D, E, . . . as shown by dotted lines. So that, the three-dimensional low-pass filter 2 is provided for preventing the intermixing of the aliasing distortion components based on those unnecessary spectrum distribution regions C, D, E, . . . with the proper signal spectrum distribution region surrounding the proper origin B. By the way, the spatial frequency low-pass filter 2 is substantially effected as the two-dimensional low-pass filter in the conversion to the 2:1 line-interlace scanning picture signal, as mentioned earlier.

At the receiving end of the configuration as shown in FIG. 23, the 2:1 line-interlace scanning picture signal derived from the demodulator 6 is reconverted into the sequential scanning picture signal through the time-axis converting circuit 7a. In this reconverted sequential scanning picture signal, the above mentioned unnecessary side band frequency components belonging to the spectrum distribution regions A, C, D, . . . again on the basis of the scanning conversion processes are contained again, and, as a result, intensely deteriorate the quality of the reproduced picture based on the proper signal distribution region B.

Consequently, for preventing the above picture quality deterioration, the three-dimensional interpolation filter 7b is provided at the receiving end of the picture contour compensation system as shown in FIG. 23.

In this connection, the practical configuration of the above system on the whole is generally arranged such as, among the unnecessary frequency spectrum distribution regions as shown in FIG. 24, the side band frequency component belonging to the region C is naturally suppressed in company with the decrease of the performance of the display equipment 8 and the visual MTF performance of the vertical spatial frequency component, whilst the side band frequency component belonging to the region D is naturally suppressed in company with the decrease of the visual MTF performance of the temporal frequency component, so that the reproduced picture quality is not affected by any distinct obstacle, but principally affected by the side band component belonging to the region A.

Next, the application of the above mentioned picture contour compensation according to the present invention to the television picture signal transmission system will be described.

In the picture contour compensation according to the present invention, as mentioned above, the contour compensation is effected regarding the two-dimensional spatial frequency region as well as regarding the temporal frequency component. In addition, the contour compensation regarding the 2:1 line-interlace scanning picture signal is performed by boosting the region adjacent to the upper limit frequency of the signal spectrum distribution region as shown by shading in FIG. 24.

The above boosted contour compensation will be described by successively referring to FIGS. 25(a), (b) and (c). That is, as shown by shading in FIG. 25(a), the boosting is effected by expanding the upper limit frequency region being close to the oblique boundary line of the necessary pass band triangular region, the boosted vertical spatial frequency performance being shown in FIG. 25(b), whilst the boosted temporal frequency performance being shown in FIG. 25(c). The boosting of the restricted spectrum distribution region of the three-dimensional low-pass filter is theoretically desirable. However, in the practical configuration thereof, it is necessary to reduce the number of circuit elements and the scale thereof as smaller as possible, so as to take the economy thereof into consideration. Accordingly, it is preferable to approximate the three-dimensional restricted filtering performance as shown in FIG. 25(a) by a combination of simple filtering performances which can be easily realized as shown in FIG. 26. This combination of simple filtering performances can be realized by employing a configuration as shown in FIG. 27.

In this configuration, 78 denotes a restricted temporal frequency band filter, the pass band performance thereof being shown by an amplitude to frequency characteristic curve (a) in FIG. 28, such as the region (a) in the pass band performance as shown in FIG. 26 is boosted. 79 denotes a restricted vertical spatial frequency band filter, the pass band performance thereof being shown by an amplitude to frequency characteristic curve (a) in FIG. 29, such as the region (b) in the pass band performance as shown in FIG. 26 is boosted. 80 denotes a restricted temporal frequency band filter, the pass band performance thereof being shown by an amplitude to frequency characteristic curve (b) in FIG. 28, such as the region (c) in the pass band performance as shown in FIG. 26 is boosted. And 81 denotes a restricted vertical spatial frequency band filter, the pass band performance thereof being shown by an amplitude to frequency characteristic curve (b) in FIG. 29, such as the region (d) in the pass band performance as shown in FIG. 26 is boosted.

In this connection, all of these filters can be easily realized by employing so-called transversal filters composed similarly, for instance, as shown in FIG. 11. Among these filters, the restricted temporal frequency band filters 78, 80 can be realized by employing transversal filters which are composed of one-field memories arranged for the sequential scanning picture signal as unit delay elements, whilst the restricted vertical spatial frequency band filters 79, 81 can be realized by employing transversal filters which are composed of one-line delays arranged for the sequential scanning picture signal as unit delay elements.

In addition, for approximating the necessary pass band performance as shown in FIG. 25(a) more closely than as shown in FIGS. 26(a) and (b), it is preferable to combine partly approximated performances, for instance, as shown in FIG. 30.

That is, temporal and vertical spatial frequency restricted band filters having respectively various amplitude to frequency performances can be composed by boosting a region approximated by minute stair-steps as shown by shading in FIG. 30.

In connection therewith, regarding the picture contour compensation of the horizontal spatial frequency component, similarly as the conventional contour compensation as mentioned earlier, a contour compensating circuit for the horizontal spatial frequency component is composed of delay lines having delay times in a measure of a few hundred nanoseconds and connected in series with the above temporal and vertical spatial frequency component contour compensating circuit. In this situation, it is preferable to boost a region corresponding to the region (b) in the pass band performance as shown in FIG. 26 regarding the vertical spatial frequency boosted region.

In addition, for simplifying the configuration of the picture contour compensating circuit according to the present invention, it is possible to omit both or either one of the temporal frequency restricted band filters corresponding respectively to the regions (a) and (c) of the pass band performance as shown in FIG. 26. That is, in the configuration as shown in FIG. 27, the restricted temporal frequency band filter 78 corresponding to the region (a) of the pass band performance as shown in FIG. 26 is comparatively significant, so that it cannot be omitted, and besides the number of necessary circuit elements is not so increased by providing the filter 78. On the contrary, the number of necessary circuit elements can be considerably reduced by omitting the restricted temporal frequency band filter 80 corresponding to the region of the pass band performance as shown in FIG. 26.

In the above description, the picture contour compensation applied with the picture signal processing according to the present invention is explained only in the situation where the sequential scanning picture signal is converted to the 2:1 line-interlace scanning picture signal. However, the picture contour compensation according to the present invention can be applied also to the scanning conversion to any further larger ratio line-interlace scanning picture signal or to the dot-interlace scanning picture signal, similarly as mentioned above, by setting up the pass band required for the three-dimensional restricted band filter and further by boosting the region adjacent to the upper limit of the required pass band similarly as mentioned above by referring to FIG. 25(a).

The above mentioned picture contour compensation applied with the picture signal processing according to the present invention is sufficient to be effected only at the sending end of the picture signal transmission system, similarly as the conventional picture contour compensation applied to the standard system television picture signal. However, if it is individually effected at each receiving ends thereof, further improved contour compensations can be attained. In this situation, the pass band of the three-dimensional restricted band filter forming the interpolation filter 7b at the receiving end of the configuration as shown in FIG. 23 is given with the required boosted performance. Further in this situation, the three-dimensional contour compensation at the sending end can be omitted, if desired, so that, even when a television camera of 2:1 line-interlace system is employed at the sending end of the picture signal transmission system, the same functional effect based on the application of the picture signal processing according to the present invention into the picture contour compensation can be sufficiently attained.

As is apparent from the explained above, it is possible according to the present invention to prevent the intermixing of the three-dimensional aliasing distortion component generated in company with the scanning in the camera at the sending end of the television picture signal transmission system into the proper signal spectrum distribution region, so that the deterioration of the reproduced picture quality can be sufficiently removed, so as to attain the high quality picture signal transmission.

In addition, at the receiving end thereof, the three-dimensional sampling frequency components and side band components thereof, which are previously contained in the received picture signal or generated by the signal processing at the receiving end, can be removed through the three-dimensional interpolation filter, and, as a result, the high quality picture consisting of the proper base band frequency components only can be displayed. Consequently, the deterioration of picture quality, which is conventionally difficult to be sufficiently prevented because of the cause thereof based on the intermixing of the three-dimensional sampling frequency components and side band components, can be distinctly improved so as to display the high quality picture.

In the situation where the above removement of unnecessary signal components through the three-dimensional filter is applied to both of sending and receiving ends of the television picture signal transmission system, the most desirable picture signal transmission system can be realized in principle.

In addition, in the situation where the three-dimensional interpolation filter having the minimum function indispensable for sufficiently suppressing unnecessary signal components is provided at the receiving end, the reproduced picture quality can be extensively improved as well as the three-dimensional restricted band filter required at the receiving end can be simplified and miniatured, so that the receiving equipment can be easily economized.

Moreover, in the situation where, at the sending end, any special picture processing including the subsampling and the time-axis conversion are not performed at all, but the conventional television picture signal of standard system is transmitted as it is, and, only at the receiving end, the above mentioned three-dimensional interpolation filtering and the time-axis conversion are effected, the picture signal processing according to the present invention can be applied to the transmission of the ordinary television picture signal.

The picture signal obtained by applying the three-dimensional band restriction, the subsampling and the time-axis conversion to the sequential scanning camera output picture signal has a signal form being substantially same as the line-interlace scanning picture signal in nature, so that the picture signal processed according to the present invention has a benefit such that it can be used together with the conventional picture signal of standard system.

That is, the picture signal converted to the 2:1 line-interlace scanning system after processed according to the present invention can be used as the standard system picture signal as it is. Moreover, at the receiving end, even if the three-dimensional interpolation filtering and the time-axis conversion are not affected to it and the conventional display is performed, the picture having the picture quality being distinctively excellent over the conventional picture with the reduced deterioration of quality caused by the intermixing of the aliasing distortion component can be displayed.

In the situation where the picture signal processing of the present invention is applied to the colour picture signal, the frame memory required for the three-dimensional filtering at the receiving end can be simplified regarding the colour signal having a narrow frequency band, so that a capacity of the frame memory, which is so large as analogized from that required for processing the monochrome picture signal, is not required, and, as a result, the receiving equipment can be simplified and economized worthily.

On the other hand, in the situation where the picture signal processing of the present invention is applied to the interframe coding of the picture signal, the three-dimensional frequency band restriction is applied to the picture signal in response to the signal form thereof at the sending end before the interframe coding is effected, and, as a result, it is possible also to reduce the amount of the interframe coded signal to be transmitted. Moreover, at the receiving end also, the frame memory required for forming the predicted frame picture signal can be simultaneously used as the frame memory required for the three-dimensional filtering according to the present invention, so that the required number of frame memories can be reduced, and, as a result, it is possible to display the reproduced picture having the distinctly improved quality with the comparatively low cost circuit arrangement.

In the situation where the picture signal processing according to the present invention is applied to the still picture broadcast also, the frame memory used for repeatedly reproducing and displaying the desired still picture at a measure of frame at the receiving end can be simultaneously used as the frame memory for effecting the three-dimensional filtering of the present invention, so that the still picture having the high quality distinctly improved by the picture signal processing of the present invention can be displayed without the accompanied increase of the cost, and, as a result, the remarkable effect for increasing the efficiency of utilization of the frame memory and for propagating the still picture broadcasting service can be obtained.

In the situation where the picture signal processing according to the present invention is applied to the picture contour compensation, the conventional frequency region to be boosted for effecting the contour compensation of the vertical spatial frequency component stays within the lower frequency range, the peak of which is one-fourth of the number N of scanning lines, whilst, according to the simultaneous use of the picture signal processing of the present invention, it is possible to raise the boosted region of the contour compensation of vertical spatial frequency components close to N/2 regarding the picture in which the temporal motion is small, as well as the boosted frequency region close to N/4 similarly as the conventional region can be maintained regarding the picture in which the temporal motion is large. Consequently, the effect of the improvement of picture quality is remarkably increased over the conventional effect, and further the extremely high quality picture can be displayed because of the removement of aliasing distortion components.

In the situation where the picture signal processing according to the present invention is used together with the picture contour compensation, the picture contour compensation is affected on the temporal frequency components, so that the contour portion of the moving target is emphasized, and, as a result, the picture quality deteriorated by the ambiguity of the moving target, which is caused by the accumulation effect of the camera tube, can be remarkably corrected.

In this connection, the picture contour compensation used together with the picture signal processing according to the present invention is sufficient to be effected only on the side of the camera in the picture signal transmission system, so that the contour compensation is not required to be individually carried out on each receiving sides thereof, and, as a result, the whole transmission system can be economically composed. However, in the situation where the three-dimensional restricted band filter is employed at the receiving end also, the above mentioned picture contour compensation used together with the picture signal processing according to the present invention can be individually effected on each receiving sides without the increased cost of the receiving equipment, so that the sending end can be conventionally composed, whilst the high quality picture can be displayed only by the picture signal processing at the receiving end.

Next, an adaptive spatio-temporal filter which is used for the band restriction adaptive to the picture signal processing according to the present invention, particularly, for varying the pass band performance in response to the motion of the picture target, so as to reproduce the high quality picture signal adaptive to the performance of the picture signal will be explained hereinafter.

The conventional television picture signal consists of a picture signal which is sampled in the vertical direction, that is, in the direction of the arrangement of scanning lines and in the temporal direction, that is, in the direction of field and frame directions by the 2:1 interlace scanning of 525 scanning lines, field frequency 60 Hz and frame frequency 30 Hz. Accordingly, in the situation where the above picture signal is expressed by the spectrum distribution in the two-dimensional coordinates along the vertical spatial frequency axis and the temporal frequency axis, the sampled picture signal, as well known, presents the spectrum distribution in which the base-band spectrum appears repeatedly on the above coordinates regarding the sampling frequency and harmonics thereof.

In FIG. 31 which presents the frequency performance of the spatio-temporal band restriction filter of the abovementioned kind, a point A shows a central frequency of an aliasing component region being the closest to the base band frequency region including the origin on the above coordinates among the sampling frequencies generated by the 2:1 interlace scanning. Accordingly, in the situation where the aliasing component region centered by the point A overlaps on the base band frequency region, the picture disturbances being peculiar to the interlace scanning picture, for instance, the interline flicker are caused by the aliasing distortion, and, as a result, the picture quality is extremely deteriorated.

For preventing the above mentioned picture disturbances, the disturbing spectrum component appearing in the above aliasing component region centered by the point A is conventionally removed through a spatio-temporal band restriction filter composed as shown in FIG. 32, as well as the 2:1 line-interlace scanning picture signal is converted to the sequential scanning picture signal of 60 frames per second according to the band restriction effect of the same filter.

A good improvement of the picture quality can be obtained according to the use of the above mentioned filter. However, the pass band performance of the spatio-temporal band restriction filter composed as shown in FIG. 32 generally presents a fixed passing region, for instance, as shown by shading in FIG. 31. In this region, the most adaptive pass band performances, which are fit respectively to the still picture and the motional picture and therefore essentially different from each other, are blended with each other. So that, contrarily speaking, it is conventionally difficult that the most adaptive filter of this kind is realized either for the still picture or for the motional picture.

The above mentioned defect of the conventional filter of this kind is based on the configuration and the performance thereof as follows.

In the conventional spatio-temporal band restriction filter composed as shown in FIG. 32, a vertical spatial frequency high-pass filter (VHPF) 92 and a vertical spatial frequency low-pass filter (VLPF) 93 are respectively composed such as one-line (1H) delays are combined as unit delaying elements, and the pass band performances of those filters 92, 93 are respectively varied by varying the rate of intermixing of the delay output signals derived from those unit delaying elements. For instance, as shown by arrow marks put on the shaded region in FIG. 31, regarding the overall pass band performance, the temporal frequency component and the vertical spatial frequency component are increased and decreased in the directions being opposite to each other.

On the other hand, according to the investigation of the base band spectrum distribution of the picture signal, regarding the still picture signal, the temporal frequency component does not exist, as well as the spectrum components appear along the vertical spatial frequency axis. As a result, it is desirable for the band restriction filter that the pass band thereof is not restricted along the vertical spatial frequency axis, while it is restricted only along the temporal frequency axis. However, in contrast thereto, regarding the motional picture signal in which a rectangular target is moving in the right direction as shown by an arrow mark in FIG. 33(a), the discontinuity of picture caused by the ambiguity in the temporal frequency component appears along the picture contour consisting of vertical edges of the rectangular target in the band restricted picture signal obtained through the temporal frequency band restriction filter, as shown in FIG. 33(b), so that the reproduced picture quality in excessively deteriorated. On the other hand, the ambiguity in the vertical direction is caused along the picture contour consisting of horizontal edges of the rectangular target in the interpolated picture signal obtained through the vertical spatial frequency band restriction filter. However, this ambiguity in the vertical direction is less noticeable than the ambiguity caused by the temporal frequency band restriction filter.

Accordingly, in the conventional spatio-temporal band restriction filter composed as shown in FIG. 32, with the intention of adapting to both of the still picture and the motional picture, the passing region is formed by the shaded region as shown in FIG. 31, which presents the pass band performance intermediating between the temporal frequency filter and the vertical spatial frequency filter. As a result, although a substantially favourable band restriction filtering effect can be obtained regarding the ordinary picture signal such as derived from the ordinary television camera, this conventional spatio-temporal filter has a serious defect that it cannot be regarded as a spatio-temporal band restriction filter presenting the most suitable pass band performance for all kinds of picture signals including the high quality television picture signal and electronically composed picture signal.

According to the present invention, for removing the above defects, an adaptive spatio-temporal filter which presents the most suitable pass band performance for both of the still picture and the motional picture, so as to facilitate the reproduction of the picture signal having the high quality without any ambiguity of contour, can be provided.

The feature of this adaptive spatio-temporal filter is that a controllable spatio-temporal filter is formed of a temporal frequency filter and a vertical spatial frequency filter for the band restriction in the scanning conversion between the sequential and the interlace scanning systems and the pass band performance thereof is controlled in relation to the motion of the picture in response to the result of detection of the interframe higher frequency component and the horizontal and the vertical spatial frequency correlative components, so as to vary the pass band performance in response to the motion of the picture.

The basic configuration of this adaptive spatio-temporal filter is shown in FIG. 34. In this basic configuration, an input is an interlace scanning picture signal, whilst an output is a sequential scanning picture signal. A vertical spatial frequency filter 95 consisting of a oneline delay and a temporal frequency filter 96 consisting of a field memory are applied with the input picture signal, whilst the output picture signals of those filters 95, 96 are added to each other in an adder ADD15, so as to obtain the output sequential picture signal.

On the other hand, a filter control circuit 97 controls the above mentioned filters 95 and 96 by applying thereto a filter coefficient control signal for varying the filter performance so as to be adapted to both of the still picture and the motional picture on the basis of the spatio-temporal picture information derived from the filters 95 and 96. In this connection with FIG. 34, single and double solid lines show the flow of information, whilst chain lines show the flow of coefficient control signal.

A basic configuration of the above filter control circuit 97 is shown in FIG. 35. In this configuration, a time difference component detector 98 is used for detecting the temporal frequency variation of the picture signal. However, this detector 98 responds to the flickering picture signal also, so that it does not necessarily operate as a detector for detecting the motional picture signal. Accordingly, the contour ambiguity of vertical edges of the rectangular target picture signal derived from the spatio-temporal filter as shown in FIG. 33(b), that is, the picture height component of vertical spatial frequency 525/2 of the picture signal having 525 scanning lines is detected by a horizontal and vertical correlative component detector 99, and further output signals detected therefrom, that is, a time-difference component detected output signal and a horizontal and vertical correlative component detected output signal are applied to a motion discriminating processor 102 respectively through weighting circuits 100 and 101, so as to obtain a product therebetween as the aforesaid coefficient control signal which controls the filter coefficient on the basis of both of the picture motion and the contour ambiguity.

An operational performance of the adaptive spatio-temporal filter basically composed as shown in FIG. 34 will be described by referring to FIGS. 36(a) to (c) hereinafter.

In FIGS. 36(a) to (c), shaded portions show the passing regions respectively and a notation "$\eta$" represents a value of the coefficient control signal derived from the filter control circuit 97, which becomes larger together with the increase of the picture motion and the contour ambiguity as mentioned above. The filter performances in the situation where this value "$\eta$" is setup as $\eta=0$, $\eta=\eta_e$ and $\eta=\eta_m$ are shown in FIGS. 36(a) to (c) respectively. That shown in FIG. 36(a) represents the filter performance relating to the still picture, according to which the deterioration of the picture resolution in the vertical direction can be prevented. On the other hand, regarding the motional picture, as mentioned earlier by referring to FIG. 33(b), the contour ambiguity of vertical edges of the rectangular target causes the deterioration of picture quality, so that, in company with the increase of the value "$\eta$" of the filter coefficient control signal, namely, the increase of the picture motion, the filter performance is varied as shown in FIG. 36(b) and further in FIG. 36(c). According to the above variation of the filter performance, for instance, the above mentioned contour ambiguity of the rectangular picture target moves from the vertical edges as shown in FIG. 33(b) to the horizontal edges as shown in FIG. 33(c). In addition, the contour ambiguity of the rectangular target is visually more noticeable on the horizontal edge thereof than on the vertical edge thereof, so that the deterioration of the picture quality, which is caused through the spatio-temporal filter, can be sufficiently removed by varying the filter performance in response to the increase of the picture motion.

Figure 37A:
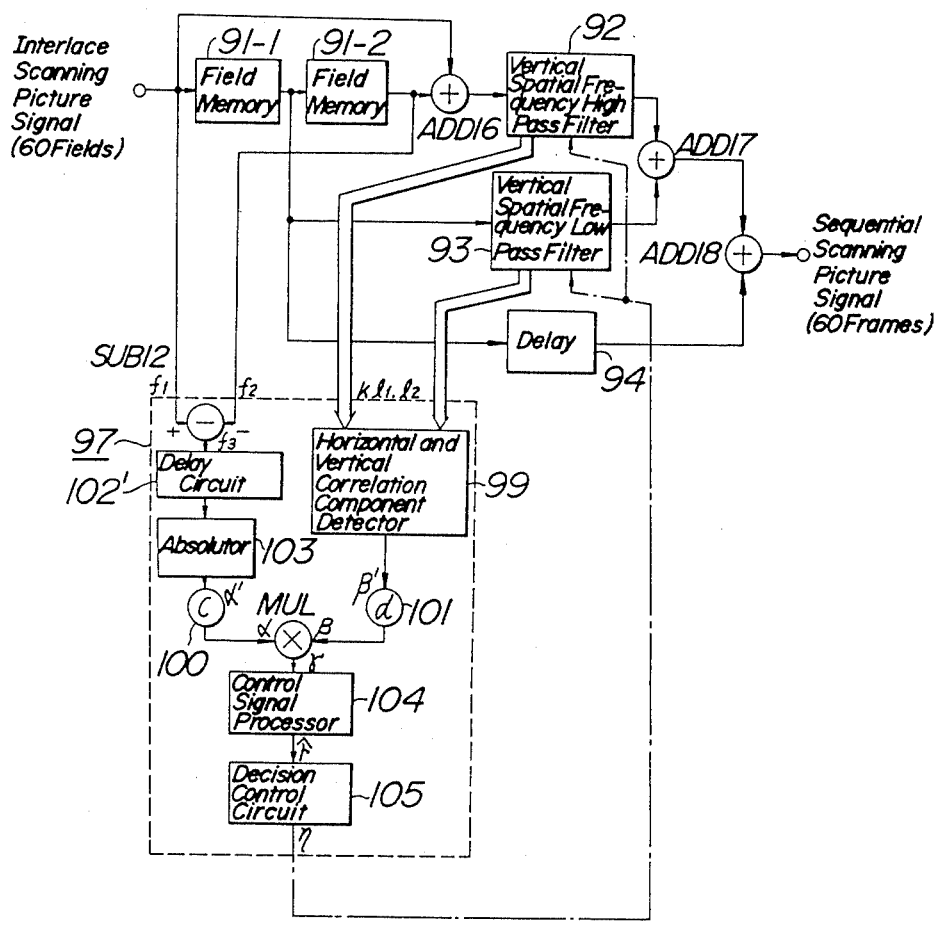

Next, in the situation where the 2:1 interlace scanning picture signal of 60 fields per second is converted to the sequential scanning picture signal of 60 frames per second, an example of a detailed configuration of the adaptive spatio-temporal filter, which is composed on the basis of the basic configuration as shown in FIG. 34, is shown in FIG. 37(a), and the operation thereof will be described hereinafter by referring to FIGS. 37(b) to (e). The configuration as shown in FIG. 37(a) is arranged by adding the filter control circuit 97 to the conventional configuration as shown in FIG. 32, which corresponds to the upper half thereof, so as to obtain the filter performance adapted to the picture motion. In this situation, the vertical spatial frequency high-pass filter 92 and the vertical spatial frequency low-pass filter 93 are modified such as the filtered output which is suitable for being supplied to the horizontal and vertical correlative component detector 99 consisting in the filter control circuit 97. In this connection, although the filter control circuit 97 is formed on the basis of the configuration as shown in FIG. 35, the time-difference component detector 98 consisting therein is formed such as an absolute value $a'$ of a difference signal $f_3$ having two fields difference, that is, one frame difference between picture signals $f_1$ and $f_2$ is obtained through an absolutor 103, and thereafter is multiplied by a weighting coefficient "c" through a weighting circuit 100, as follows.

$$a' = |f_3| = |f_2 - f_1| \quad (1)$$

$$a = ca' \quad (2)$$

On the other hand, in the horizontal and vertical correlative component detector 99, the filter outputs $k_{l1,l2}$ are derived respectively from the vertical spatial frequency high-pass filter 92 and the vertical spatial frequency low-pass filter 93 are taken out as respective delayed outputs of respective stages of a spatio-temporal transversal filter as mentioned later by referring to FIGS. 39 and 40, so as to form a correlative component between those delayed outputs.

These respective delayed output signals $k_{l1,l2}$ of respective stages of the spatio-temporal transversal filter consisting in those vertical spatial frequency high- and low-pass filters 92 and 93 consist, as shown in FIG. 38(a), of picture signal components corresponding respectively to points as shown by minute circles on respective scanning lines of the filter output picture signal derived from those high- and low-pass filters 92 and 93, which lines are shown respectively by dotted and solid lines, and these points are represented by a matrix as shown in FIG. 38(b).

As mentioned above, the vertical spatial frequency high-pass filter (VHPF) 92 and the vertical spatial frequency low-pass filter (VLPF) 93 are, as shown in FIGS. 39 and 40 respectively, formed of transversal filters in which each stage delayed signals derived from one-line delays 111-1 to 111-m are added to each other in an adder ADD20 through n stage picture element interval $\tau$ delays 112-n to 112-1, a $t_1$ delays 113 and a coefficient (a) multiplier 114 or a coefficient (b) multiplier 115 successively. In the horizontal and vertical correlative component detector, as shown in FIG. 41, each stage picture element interval $\tau$ delayed signals $k_{l1,l2}$ derived respectively from the transversal filters forming respectively the vertical spatial frequency high- and low-pass filters 92 and 93 are added to each other in an adder 118 alternately through a coefficient (+1) multiplier 116 and a coefficient (−1) multiplier 117, and further added output signals "v" derived therefrom are applied to an adder ADD21 through an absolutor 119, so as to take out therefrom a horizontal and vertical correlative component "$\beta'$" as a compounded output signal.

The delay 102' consisting in the filter control circuit 97 of the spatio-temporal filter as shown in FIG. 37(a) and the $t_1$ delays 113 consisting in the vertical spatial frequency high- and low-pass filters 92 and 93 as shown respectively in FIGS. 39 and 40 are provided for applying to the picture signal with the delay time $t_1$ required for adjusting the timing between the picture signal and the coefficient control signal in each stages.

In the horizontal and vertical correlative component detector 99 consisting in the filter control circuit 97 of the spatio-temporal filter as shown in FIG. 37(a), the correlative component "$\beta'$" is detected as the vertical contour ambiguity appearing, for instance, on the vertical edges of the rectangular picture target by applying the operational process based on the configuration as shown in FIG. 41 to the picture signal and further is presented by the following equations regarding the compounded output signals "$v_i$" of the each stage adders 118-i in the above mentioned horizontal and vertical correlative component detector 99.

$$\beta' = \sum_{i=1}^{n} |v_i| \quad (3)$$

$$v_i = \sum_{l=1}^{m} (-1)^{l-1} k_{l,i} \quad (4)$$

The coefficient (+1) multiplier 116 and the coefficient (−1) multiplier 117 consisting in the horizontal and vertical correlative component detector 99 are provided for alternately reversing the polarity of the each stage delayed output picture signals. The resultant each stage delayed output picture signals $k_{1,i}$, $K_{2,i}$, ..., $k_{m,i}$ consisting in the compounded output signal "$v_i$" of the above alternately reversed polarity delayed picture signals represent detected points arranged on the picture as shown in FIG. 38(a) in the vertical direction thereof during two field intervals. So that, the each stage compounded output signals "$v_i$" of those alternately reversed polarity delayed picture signals derived from the coefficient (+1) and the coefficient (−1) multipliers 116 and 117 in the configuration as shown in FIG. 41 become correlative components consisting of vertical spatial frequency components 525/2 (cycle/picture height). On the other hand, regarding the contour ambiguity of vertical edges of the rectangular picture target as shown in FIG. 33(b), the vertical spatial frequency component 525/2 (cycle/picture height) is dominant, so that above compounded output signal "$v_i$" presents a large value. In this connection, this compounded output signal "$v_i$" obtained with respect to plural detectd points in the horizontal direction as shown in FIG. 41 and further the correlative component "$\beta'$" consisting of the compounded output signal thereof are required for detecting the picture motion in the horizontal direction of the picture, and further the region of the contour ambiguity of vertical edges is enlarged in company with the increase of speed of the picture motion, so that the correlative component "$\beta'$" consisting of the sum total of the absolute values $|v_i|$ of the compounded output signal "$v_i$" presents a large value also.

An input signal $\gamma$ of a control signal processing circuit 104 consisting in the filter control circuit 97 in the configuration as shown in FIG. 37(a) is expressed on the basis of the above equations (2) and (3) as follows.

$$\gamma = a \cdot \beta \quad (5)$$
$$a = ca'$$
$$\beta = d \cdot \beta' \quad (6)$$

In this connection, the coefficient "d" in the equation (6) is a weighting coefficient for the horizontal and vertical correlative component "$\beta$", so as to effect the weighting by a coefficient multiplier 101.

Figure 37B:
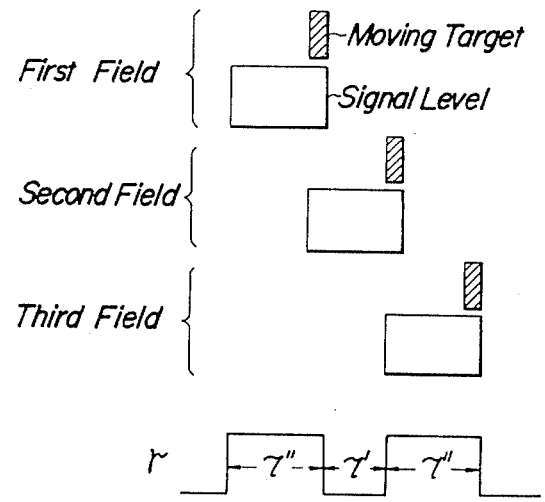
Figure 37C:
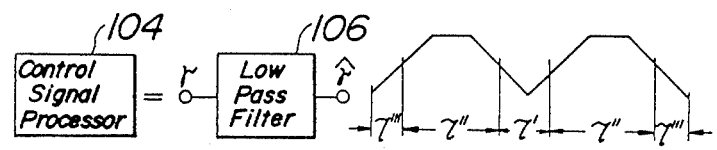

On the other hand, it is probable in the motional picture having a quick motion that the control signal "$\gamma$" does not appear within the time duration $2\tau'' + \tau'$ corresponding to the region of picture motion, as shown in FIG. 37(b), and, as a result, the conventional deterioration of the picture quality may be caused by the temporal frequency component filtering. That is, as shown in FIG. 37(b), the control signal "$\gamma$" which appears as the interframe difference component, is generated, for instance, as the difference component between the first and the third fields. Accordingly, when the motion of the picture target is extremely quick, the interframe difference signal is generated during the interval $\tau''$ as shown in FIG. 37(b) corresponding to the region of the picture motion, whilst the signal level of the control signal "$\gamma$" becomes zero during the interval $\tau'$ corresponding to the second field. The control signal processor 104 consisting in the filter control circuit 97 in the configuration of the spatio-temporal filter as shown in FIG. 37(a) is provided for generating the control signal "$\gamma$" during the above interval $\tau'$ also, and can be composed of the low-pass filter 106, as shown in FIG. 37(c). The impulse response in the situation where the interframe difference signal "$\gamma$" having the signal waveform as shown in FIG. 37(b) is applied to the low-pass filter having the above mentioned impulse response length disappears during the interval $\tau'$ as mentioned above by referring to FIG. 37(b) on the basis of the ambiguity of the waveform as shown in FIG. 37(c).

Figure 37D:
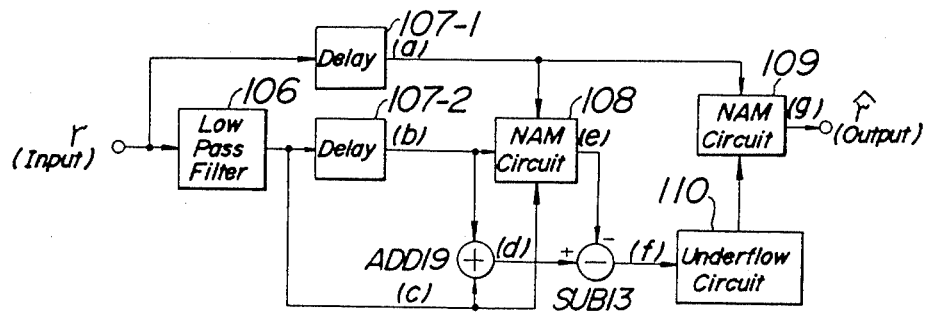

In this connection, the above shown impulse response length $\tau'$ is the maximum value worthy to be compensated by the configuration as shown in FIG. 37(d).

Figure 37E:
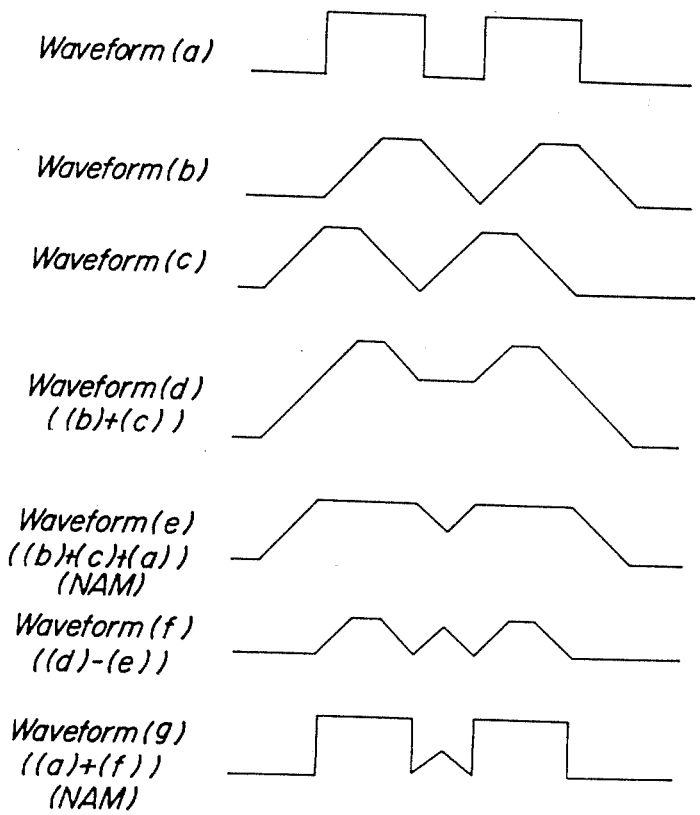

However, in the situation where the control signal processor 104 is compared of the simple low-pass filter 106 as shown in FIG. 37(c), and further the time delay caused by the filtering of the coefficient control signal consisting of the filter output thereof is compensated, the coefficient control signal has a defect that excessive time durations $\tau'''$ appears before and after the waveform of the interframe difference signal as shown in FIG. 37(b). An example of the configuration of the control signal processor 104 arranged such as this defect is removed, and, as a result, the coefficient control signal can be obtained throughout the time duration corresponding to the interframe difference signal "$\gamma$" as shown in FIG. 37(b) is shown in FIG. 37(e), and further various operational waveforms (a) to (g) thereof are shown in FIG. 37(e). In this configuration, a filter output signal (c) having the waveform (c) which is derived from a low-pass filter applied with the input interframe difference signal "$\gamma$", a delayed output signal (a) having the waveform (a) which is derived from a delay 107-1 applied with the input interframe difference signal "$\gamma$" also for compensating the timing between this signal "$\gamma$" and the filter output signal (c), and a delayed output signal (b) having the waveform (b) which is derived from another delay 107-2 corresponding to the delay 107-1 for delaying the filter output signal (c) are applied to a NAM circuit 108 for effecting the non-additive mixing of those signals (a), (b) and (c), so as to obtain a mixed output signal (e) having the waveform (e). This mixed output signal (e) and an added output signal (d) having the waveform (d) which is derived from an adder ADD9 applied with the delayed output signal (b) are applied to the subtracter SUB13, so as to obtain a subtracted output signal (f) having the waveform (f). This subtracted output signal (f) is applied to an underflow circuit 110 for deriving therefrom a zero output signal in response to a negative input signal, as well as for deriving therefrom a positive input signal as it is. An output signal of this underflow circuit 110 and the above mentioned delayed output signal (a) are applied to another NAM circuit 109, so as to obtain a processed output control signal "$\hat{\gamma}$" having an appropriate waveform (g) such as a positive output signal level can be obtained also during the zero level interval $\tau'$ of the input interframe difference signal "$\gamma$" and further any excessive positive output signal is not generated in a motional and a still picture regions appearing respectively before and after this zero level interval $\tau'$. In this connection, the delay time of the delays 107-1 and 107-2 is setup equal to the impulse response length of the low-pass filter 106.

Next, an input to output performance of the coefficient control signal "$\eta$" derived from a decision control circuit 105 applied with the above processed output control signal "$\hat{\gamma}$" becomes as shown in FIG. 42. In FIG. 42, the output coefficient control signal "$\eta$" becomes dispersive values such as $\eta_1, \eta_2, \ldots, \eta_m$ in response to the level variation of the input processed control signal "$\hat{\gamma}$" such as $\gamma_1, \gamma_2, \ldots, \gamma_m$ respectively, and, as a result, varies the coefficients $a_i$ and $b_i$ to be multiplied to the each stage delayed picture signals in the coefficient multiplies $114_i$ and $115_i$ consisting respectively in the vertical spatial frequency high-pass filter (VHPF) and the vertical spatial frequency low-pass filter (VLPF) as shown in FIGS. 39 and 40 respectively. In this connection, although the coefficient control signal "$\eta$" can be generally setup as continuous values, it is preferable for forming a hardware thereof that this signal "$\eta$" is setup as dispersive values, because it is not so effective to setup this signal "$\eta$" as continuous values. Furthermore, the input to output performance as shown in FIG. 2 can be easily realized by employing a comparator, whilst the relation between this coefficient control signal "$\eta$" and the variation of the spatio-temporal filter can be setup as shown in FIGS. 36(a) to (c). That is, when $\eta=0$, the filter performance is required for the still picture signal, so that the spatio-temporal filter should be formed as a temporal filter consisting of field memories only, whilst, when $\eta>0$, the filter performance is varied such as shown in FIG. 36(b) or (c), and, as a result, various parameters of the filter control circuit 97 are setup such as the picture quality deterioration is removed by matching the picture contour ambiguity as shown in FIG. 33(b) or (c) with the visual performance. On the other hand, regarding the filter performance as shown in FIG. 36(a), the vertical spatial frequency high-pass filter (VHPF) 92 is modified as wholethrough as well as the coefficient $b_i$ of the vertical spatial frequency low-pass filter (VLPF) 93 is setup as $b_i=0$, while, regarding the filter performance as shown in FIG. 36(c), the coefficient $a_i$ of the vertical spatial frequency high-pass filter (VHPF) 92 is setup as $a_i=0$. Under these modifications, the vertical spatial frequency high-pass filter (VHPF) 92 and the vertical spatial frequency low-pass filter (VLPF) 93 are operated respectively as a temporal filter and a vertical spatial filter.

In the above explanation, the situation where the 2:1 line-interlace scanning picture signal is converted to the sequential scanning picture signal is exemplified. However, the configurations as shown in FIGS. 34, 35 and 37(a) can be expandedly applied to the situation when the multi-ratio interlace scanning picture signal is converted to the sequential scanning picture signal. In addition, in the situation where the three-dimensional prefilter required for the spatio-temporal sampling is provided at the sending end, the receiver for receiving the high quality television picture signal which is affected with the sequential scanning picture processing and the interlace scanning transmission is provided with the above mentioned adaptive spatio-temporal filter, an extremely remarkable effect can be expected.

As is apparent from the above description, according to the present invention, an adaptive spatio-temporal filter presenting a spatio-temporal filter performance adapted to both of a still and a motional pictures can be provided as a spatio-temporal filter used for converting an interlace scanning picture signal to a sequential scanning picture signal, and, as a result, the sequential scanning still picture signal can be reproduced without the accompanied contour ambiguity. That is, the filter performance of this spatio-temporal filter is controlled in response to the result of the detection of all of time-difference components and horizontal and vertical correlative components of the picture signal, so that the most preferable spatio-temporal effect can be obtained regardless of the difference between the still and the motional pictures as well as regardless of the magnitude of the picture motion, and the most suitable filter performance adapted to the picture performance can be realized as occasion demands, and further the configuration of the spatio-temporal filter can be simplified.

Next, the improvement of the performance of the above mentioned adaptive spatio-temporal filter for interpolating the sequential scanning picture signal converted from the interlace scanning picture signal in response to the picture motion, particularly for removing the influence of the spurious signal component and the noise component generated in company of the scanning conversion and further for facilitating the reproduction of the high quality sequential scanning picture signal with the simplified configuration will be described hereinafter.

In the configuration of the spatio-temporal filter as shown in FIG. 43, no more than the detection of the information regarding the picture motion and the interpolation of the interframe difference signal component is performed without any countermeasure to meet various undesired injurious signal components, for instance, the noise component originally residing in the picture signal, the noise intermixed through the transmission line, the spurious signal component generated in the still picture region by the dissolving and the interframe difference signal component generated in the still picture region by the jitter accompanied with the phase shift of the sampling clock signals between the sending and the receiving ends. So that, the above shown configuration of the spatio-temporal filter has a defect that an undesired variation of the filter performance is caused by the application of the picture signal containing those injurious signal components, and, as a result, an erroneous operation based on a kind of mode conversion is carried out. Accordingly, an adaptive spatio-temporal filter provided with an improved filter control signal processor, such as the desired filter performance can be maintained against the application of the picture signal containing those injurious signal components, so as to remove the above mentioned defect, is conceived. This conceived adaptive spatio-temporal filter, which is used for the signal band restriction and the interpolation required for the scanning conversion between the interlace scanning and the sequential scanning of the picture signal under the control of the filter pass band performance in response to the picture motion, is featured in that the above mentioned various noises and the spurious components consisting of the erroneous interframe difference signals in response to the picture motion are removed by referring to the threshold which is setup in response to the detection of the noise component and the two-dimensional spatial high frequency component of the picture signal.

In the adaptive spatio-temporal filter as above shown in FIG. 43, a frame difference picture signal is derived from a subtractor SUB14, and an absolute value $\beta$ thereof obtained through an absolutor 24 is interpolated by the control signal processor 125, so as to form a control signal $\hat{\gamma}$, which is converted to a filter coefficient $\eta$ through a decision control circuit 126. Under the control of this filter coefficient $\eta$, the filter performances of a vertical spatial frequency high-pass filter 122 applied with the averaged one-frame difference picture signal derived from an adder ADD22 and a vertical spatial frequency low-pass filter 123 applied with a one-field delayed picture signal corresponding to a temporal intermediate value of the picture signal.

The cause of the occurrence of erroneous operation in the operational mode changing in response to the above variation of the filter performance can be considered to be the existence of the following undesired signal components as mentioned earlier.

(1) The spurious interframe difference signal component generated in the still picture region by the jitter based on the phase shift of the sampling clock signals between the sending and the receiving ends of the transmission.

(2) The spurious interframe difference signal component generated in the still picture region on the picture switching by dissolving.

(3) The noise component intermixed through the transmission line.

(4) The noise component originally residing in the picture signal.

Against the above, in an improved adaptive spatio-temporal filter according to a configuration as shown in FIG. 44, the spurious interframe difference signal components as mentioned in the items (1) and (2) are removed by discriminating the absolute value $\beta$ of the interframe difference signal component by referring to a threshold setup in response to the detected two-dimensional spatial higher frequency range component, whilst the noise components as mentioned in the above items (3) and (4) are removed by discriminating the same absolute value $\beta$ by referring to another threshold setup in response to the detected noise level during the vertical synchronizing signal interval.

Further speaking in detail, in the configuration as shown in FIG. 44, the threshold referred to for discriminating and removing low amplitude noises in a corer 128 is varied in response to the two-dimensional spatial higher frequency range component detected by a two-dimensional high frequency component detector 127 as mentioned later by referring to FIG. 47, and, as a result, the low level signal component forming minute components of the absolute value $\beta$ of the interframe difference signal component. On the other hand, the threshold referred to for discriminating and removing low amplitude noises in another corer 129 is varied in response to the noise level during the vertical synchronizing signal interval, which level is integrated and maintained in a noise separator 131 as mentioned later by referring to FIG. 52, and, as a result, the low level noise component forming minute component of the absolute value $\beta$ of the interframe difference signal component. Furthermore, a decision control circuit 132 applied with the output signal of the corer 129 through an elimination circuit 130 of independent points and a control signal processor is controlled in response to the above integrated noise level, and, as a result, the spatio-temporal filter coefficient generated in the decision control circuit 132 is varied for adjusting the coefficient conversion performance.

Next, prior to the detailed description of respective elements of the above configuration as shown in FIG. 44, the procedure of occurrence of the jitter caused at the horizontal edges of the picture target, which is based on the sampling clock signal as mentioned in the above item (1), will be described by referring to FIG. 45.

Points $a_1$, $a_2$, $a_3$ on a signal waveform of the horizontal edge of the picture target as shown a dotted line in FIG. 45 are sampling points, the time duration T between those sampling points $a_1$ and $a_2$ representing the sampling interval and the deviation $\Delta T$ thereof representing the equivalent jitter of the sampling interval T which appears during the frame interval. In this connection, those sampling points $a_1$, $a_2$, $a_3$ represent the sampled levels of the present picture frame and the other sampling points $b_1$, $b_2$, $b_3$, which are apart therefrom respectively by an amount $\Delta T$ of the jitter, represent the sampled levels of the immediately succeeding picture frame. Accordingly, the level difference $\Delta y_2$ between the sampling points $a_1$ and $b_1$ corresponds to the spurious interframe difference signal component generated by the jitter. On the other hand, the level difference $\Delta y_3$ between the sampling points $a_1$ and $a_2$ has the following relation to the spurious interframe difference signal component $\Delta y_2$.

$$|\Delta y_3| \gg |\Delta y_2| \qquad (7)$$

where $\Delta y_3 = a_2 - a_1$, $\Delta y_2 = b_1 - a_1$

That is, under the assumption of a coefficient $k_2 \ll 1$, $$|\Delta y_2| = k_2 |\Delta y_3|$$

On the other hand, under the assumption that an absolute level of the proper interframe difference signal component appearing when the above shown contour moves in the horizontal direction is $|\Delta y_4|$, $$|\Delta y_4| \simeq |\Delta y_3| \qquad (8)$$

Accordingly, a threshold level $\Delta$ used for the coring, by which the low level spurious interframe difference signal component is removed from the proper interframe difference signal component, can be setup sufficiently high, and, as a result, can be setup as follows.

$$|\Delta y_2| < \Delta < |\Delta y_3| \quad (9)$$

In the situation where the coring is carried out by using the threshold level setup by the above inequality (9), the spurious interframe signal component based on the jitter can be sufficiently removed. Further, in the situation where an erroneous operation is effected in the picture motion detection based on the interframe difference signal, a dual picture caused by the shift as shown in FIG. 46(b) appears generally in the rectangular picture target as shown in FIG. 46(a). However, in the situation where the threshold level is appropriately setup in response to the absolute level of the higher frequency component in the horizontal direction at the picture contour as mentioned above, and, as a result, the coring of the interframe difference signal component can be appropriately effected, the above mentioned dual picture does not appear at all, as well as the erroneous operation based on the spurious interframe difference signal component is not effected at all. Consequently, the most appropriate reproduction of the picture signal can be performed.

An example of a detailed configuration of the two-dimensional spatial high frequency component detector 127, in which the absolute level of the horizontal spatial higher frequency component is detected, is shown in FIG. 47 in relation to the configuration as shown in FIG. 44.

In this detailed configuration, the horizontal spatial high frequency component is detected through a horizontal spatial high frequency component detector 133, the detected output thereof being applied to an absolutor 135-1 so as to derive an absolute level of the high frequency component therefrom. This high frequency component absolute level is applied to a horizontal spatial frequency low-pass filter 136, so as to expand the control time duration, during which the coring of the interframe difference signal component is effected, on the basis of this high frequency component absolute level.

An example of the impulse response of the horizontal spatial frequency low-pass filter 136 is shown in FIG. 48. According to this exemplified impulse response, when an impulse having an amplitude, for instance, of "1" is applied to the horizontal spatial frequency low-pass filter 136, two impulses having an amplitude "½" respectively appear at the output thereof apart from each other by the interval T relating the cutoff frequency of the digital filter 136. So that, it is possible by setting up this interval T as equal to the sampling interval to expand the control time duration required for the coring to one sampling interval.

An example of the operational effect of the coring, which is applied to the interframe difference signal component on the basis of the horizontal spatial frequency component derived from the horizontal spatial frequency low-pass filter 136 as mentioned above, will be described by referring to FIGS. 49(a) to (e).

Figure 49A:
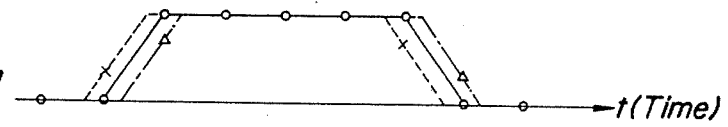
Figure 49B:
Figure 49C:
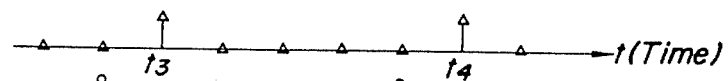

Regarding the picture signal having a signal waveform as shown by a solid line in FIG. 49(a), another picture signal formed under the consideration of the phase jitter of the sampling clock signal as mentioned above can be shown by another waveform as shown by a dotted or a chain line. In the situation where a picture signa is sampled by the clock signal having the phase jitter, the absolute spurious interframe difference signal component generated from the picture signal as shown by the dotted line becomes as shown in FIG. 49(b), whilst the absolute spurious interframe difference signal component generated from the picture signal as shown by the chain line becomes as shown in FIG. 49(c). So that, the coring control can be effected only with respect to the each sampling points.

Figure 49D:
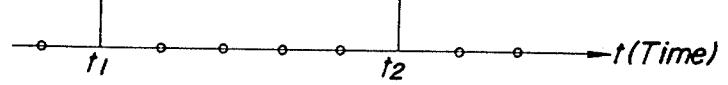
Figure 49E:
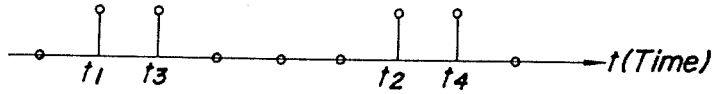

On the other hand, the higher frequency range component of the original picture signal as shown by the solid line can be obtained as differential signals as shown in FIG. 49(d), which can be obtained only at clocks $t = t_1, t_2$. So that, those differential outputs become zero at the control clocks $t_3$ and $t_4$. Consequently, the normal coring control signal cannot be obtained only on the basis of those differential output signals, because of the shift of the control clocks. For removing this shift of the control clocks, similarly as mentioned above, absolute signals of those differential outputs are applied to the horizontal spatial frequency low-pass filter, so as to obtain substantially equivalent differential output signals as shown in FIG. 49(d).

On the other hand, the deterioration of the picture quality such as the ambiguity of the vertical edges based on the spurious interframe difference signal component, which is generated, as mentioned in the aforesaid item (2), in the still picture region in company with the switching of the picture by dissolving, appears noticeably regarding the picture signals having the high level component in the vertical spatial high frequency region. However, in the situation where the switching of the picture signals by dissolving is extremely speedily carried out, the deterioration of the picture quality, which is caused by the spurious interframe difference picture component, is substantially difficult to be visually noticed. So that, the spurious interframe difference signal component of this kind is not substantially an obstacle. On the contrary, in the situation where the switching of the picture signal is slowly carried out, the level of the spurious interframe difference signal component is low, so that the operational mode of the interpolation filter is not changed by the influence thereof.

Further, in the situation where the switching of the picture signal is carried out at an intermediate speed and the deterioration of the picture quality which is caused by dissolving, is noticeable, the level $\Delta y_5$ of the spurious interframe difference signal component and the level $\Delta y_6$ of the vertical spatial high frequency picture signal component at the time point concerned have the following relation therebetween.

$$|\Delta y_5| << |\Delta y_6| \quad (10)$$

As a result, when the threshold level used for the coring effected on the interframe difference signal component is denoted by $\Delta$ and the interframe difference signal component of the motional picture signal is denoted by $\Delta y_7$, the following relation can be setup.

$$|\Delta y_5| < \Delta < |\Delta y_6| \cong |\Delta y_7| \quad (11)$$

In this situation, it is possible to remove the spurious interframe difference signal component and further to detect the motion of the picture.

In the detailed configuration of the two-dimensional spatial high frequency component detector as shown in FIG. 47, the vertical spatial high frequency component detector 134 is provided for detecting the vertical spatial high frequency component at vertical picture contour and applying the detected output to the absolutor 135-2 so as to derive the absolute value thereof. On the other hand, the picture quality deterioration caused by the ambiguity in the vertical direction based on the spurious interframe difference signal component generated by dissolving is given with the extent affected thereby according to the temporal length of the impulse response to the vertical spatial frequency high-pass filter 122 and the vertical spatial frequency low-pass filter 123 consisting in the spatio-temporal filter composed as shown in FIG. 43. So that, it is required to extend the region of generation of the control signal therefor through the vertical spatial frequency low-pass filter 137 consisting in the two-dimensional spatial high frequency component detector 127 composed as shown in FIG. 47. In addition, among the various picture quality deteriorations caused by the erroneous operation of the picture motion detection based on the interframe difference signal component, the effect of the picture quality deterioration based on the dual image disturbance as shown in FIGS. 46(a) and (b) is the greatest. So that, the horizontal spatial interframe difference signal component should be preferentially operated as the control signal used for the coring applied to the interframe difference signal component. Further, the selection and precedence circuit 138 consisting in the two-dimensional spatial high frequency component detector 127 composed as shown in FIG. 47 is provided for precedently outputting the horizontal direction control signal $x_2$ derived from the horizontal spatial frequency low-pass filter 136 prior to the vertical direction control signal $y_2$ derived from the vertical spatial frequency low-pass filter 137, and for selecting the horizontal direction control signal $x_2$ as the output signal $x_1$ derived therefrom regardless of the extent of the vertical direction control signal $y_2$, when the following relation is obtained with respect to a constant value $d_1$, $$x_2 \geq d_1 \tag{12}$$

as well as for selecting the vertical direction control signal $y_2$ as the output signal $x_1$ derived therefrom, when the following relation is obtained.

$$x_2 < d_1, y_2 > x_2 \tag{13}$$

In this connection, the corers 128 and 129 consisting in the configuration as shown in FIG. 44 have the input to output performance as shown in FIG. 50, according to which the input level $\Delta$ effecting as the threshold for discriminating and removing the low level component as shown in FIG. 50 is used as the coring level.

In addition, the characteristic curve presenting the relation between the coring control signal x and the coring level $\Delta$ in the corers 128, 129 having the above input to output performance is shown in FIG. 51. Regarding this characteristic curve, the coring level $\Delta_1$ represents the lowest one. In this connection, the coring control performances differ from each other between the corers 128 and 129 similarly as shown in FIG. 51.

Next, an example of the detailed configuration of the noise separator 131 consisting in the configuration as shown in FIG. 44 is shown in FIG. 52. In this configuration, the noise level of the picture signal during the vertical synchronizing signal interval is extracted through the gate circuit 139 gated by the vertical synchronizing signal, and then applied to the hold circuit 141 controlled by the vertical synchronizing signal through the low-pass filter 140, so as to obtain the noise separated output $x_3$ by maintaining the above noise level during one-field interval. In this connection, in the situation where the noise level of the original picture signal obtained at the sending end is already high, it is preferable to process the picture signal to be transmitted at the sending end as follows.

That is, a sinusoidal wave signal having a single frequency, which can be easily and securely discriminated as the noise component through the above mentioned noise separator 131 at the receiving end, is rather positively superposed at the vertical synchronizing signal interval of the picture signal with an extremely low detectable level thereof, so as to securely operate the noise separator 131 at the receiving end such as the influence of the original noise component contained in the picture signal can be securely removed together with the influence of the noise component intermixed through the transmission line.

The output signal $x_3$ of the hold circuit 141 consisting in the configuration as shown in FIG. 52 is applied to the corer 129 and the decision control circuit 132 consisting in the configuration as shown in FIG. 44. In the corer 129, the coring threshold level control performance as shown in FIG. 51, particularly, the lowest coring level $\Delta_1$ thereof is appropriately setup under the control of the output signal $x_3$ of the noise separator 131 such as the noise component is removed from the incoming interframe difference signal component, so as to prevent any obstruction caused in the picture motion discrimination effected for deciding the interpolation filtering performance.

However, in the situation where the noise level of the incoming interframe difference signal component, and, as a result, the coring threshold level cannot help being setup also high so as to remove the high level noise component, the low level component of the normal interframe difference signal component is removed together with the noise component under the possibility that the most distinctive dual image disturbance appears. So that, it is required for preparing for this situation in the decision control circuit 132 that the interpolation filtering performance is converted from the still picture mode to the motional picture mode under the control of the output signal $x_3$ of the noise separator 131. Furthermore, in this situation where the noise level is high in the whole picture signal, the still picture mode of the interpolation filtering performance, in which the reproduction of the highest frequency component in the still picture region is facilitated, cannot present the effect thereof because of the masking effect of the noise component of the original picture signal, so that the still picture mode itself is nonsense.

On the other hand, the decision control circuit 132 consisting in the configuration as shown in FIG. 44 is provided for carrying out the similar operation as that of the decision control circuit 126 consisting in the adaptive spatio-temporal filter as shown in FIG. 43, such as the filtering performances of the vertical spatial frequency high-pass filter 122 and the vertical spatial frequency low-pass filter 123 are respectively decided on the basis of the filter coefficient control signal "$\eta$" as the output signal. However, the input to output performance thereof between the input process control signal "$\hat{\gamma}$" and the output filter coefficient control signal "$\eta$" is setup such as the following amount "$\xi$" is used as the input signal in the input to output performance as shown in FIG. 53.

That is, the amount "$\xi$" has the following relation in which the influence of the noise separation output signal $x_3$ is added to the input process control signal "$\hat{\gamma}$" and a constant "$k_1$" is employed.

$$\xi = k_1 x_3 + \hat{\gamma} \qquad (14)$$

On the contrary, in the input to output performance according to the configuration as shown in FIG. 43, the output signal "$\eta$" is setup to amount to dispersive values $\eta_1, \eta_2, \ldots, \eta_m$ in response to the variation of the input signal "$\gamma$" such as $\gamma_1, \gamma_2, \ldots, \gamma_m$.

As a result, in the situation where the noise level of the interframe difference signal component becomes high and then the noise separation output signal $x_3$ becomes large, the filter coefficient control signal "$\eta$" does not amount to $\eta=0$ corresponding to the still picture mode regardless of the value of the process control signal "$\hat{\gamma}$", so that it is not at all in danger of the occurrence of the dual image disturbance as mentioned above.

As is apparent from the described above, according to the above improved adaptive spatio-temporal filter of the present invention, the erroneous operation of the adaptation control of the interpolation filtering performance, which is caused by the influence of the spurious interframe difference signal component generated on the basis of the jitter based on the phase shift of the sampling clock signal and the synchronizing signal, the spurious interframe difference signal generated on the switching of picture signals by dissolving and the noise contained in the original picture signal or intermixed therein through the transmission line, can be sufficiently prevented, so that it is possible to reproduce the high quality sequential scanning picture signal on the conversion between the interlace scanning system and the sequential scanning system with the use of the simplified spatio-temporal filter.

Consequently, according to the above improved adaptive spatio-temporal filter, it is possible that the high quality sequential scanning picture signal is reproduced in the ordinary domestic receiver provided for receiving the standard system television broadcast, and it is possible also that the receiving system is employed for the high quality television broadcast receiving system, and further various distinctive effects can be obtained by applying the above improved spatio-temporal filter to the various picture signal processing, for instance, the television system conversion.

What is claimed is:

1. A picture signal processing system in which a sequential scanning wideband picture signal is converted into an interlace scanning narrowband picture signal and reconverted into substantially its original state after transmission through a narrowband transmission line, comprising at a sending end:
   a picture signal generating means for generating said sequential scanning wideband picture signal,
   a multidimensional spatio-temporal prefiltering means for filtering aliasing signal components caused in said picture signal by sampling required for scanning conversion to provide a filtered picture signal,
   a subsampling means for sampling said filtered picture signal, so as to convert said sequential scanning wideband picture signal into an interlace scanning wideband picture signal,
   a time axis converting means for expanding the time axis of said interlace scanning wideband picture signal, so as to convert said interlace scanning wideband picture signal into said interlace scanning narrowband picture signal, and
   a modulating means for modulating a carrier signal by said interlace scanning narrowband picture signal; and comprising at a receiving end:
   a demodulating means for demodulating the modulated carrier signal, so as to restore said interlace scanning narrowband picture signal,
   a time axis reconverting means for compressing the time axis of said restored interlace scanning narrowband picture signal, so as to convert said restored interlace scanning narrowband picture signal into an intermittent quasi-wideband picture signal,
   a multidimensional spatio-temporal interpolation filtering means for filtering aliasing signal components in said picture signal caused by resampling required for scanning reconversion and for interpolating said intermittent quasi-wideband picture signal so as to substantially restore said sequential scanning wideband picture signal, and
   a display means for displaying the substantially restored sequential scanning wideband picture signal, wherein both of said spatio-temporal prefiltering means and said spatio-temporal interpolation filtering means have a passing region substantially restricted to a lower frequency region on at least a coordinate plane extending along a vertical spatial frequency axis and a temporal frequency axis of multidimensional coordinates consisting of a horizontal spatial frequency axis, a vertical spatial frequency axis and a temporal frequency axis, provided for defining said picture signal, which lower frequency region includes an origin of said multidimensional coordinates which is separated from a higher frequency region, in which said aliasing signal components appear, by a symmetrical line intercrossing both of the vertical spatial frequency axis and the temporal frequency axis and equally distant from both of said origin and an imaginary origin corresponding to a sampling frequency employed for the sampling of said picture signal.

2. A picture signal processing system as claimed in claim 1, wherein both of said spatio-temporal prefiltering means and said spatio-temporal interpolation filtering means consist of a combination of at least one vertical spatial frequency lowpass filter and at least one temporal frequency lowpass filter which lowpass filters have cutoff frequencies corresponding to coordinate points residing in the vicinity of said symmetrical line respectively.

3. A picture signal processing system as claimed in claim 2, wherein said vertical spatial frequency lowpass filter and said temporal frequency lowpass filter are transversal filters formed of a series connection of a plurality of delay elements consisting of one-line memories and one-frame memories, respectively, which are individually weighted to produce a filtered output.

4. A picture signal processing system as claimed in claim 1, wherein the spatio-temporal prefiltering means is constructed to have a transfer function in a comparatively higher frequency region which is larger than that in a comparatively lower frequency region so as to increase a signal component existing in said comparatively higher frequency region.

5. A picture signal processing system as claimed in claim 1, further including means for detecting picture motion of said picture signal to be converted at least from an interframe difference picture signal component of said picture signal, and means for adaptively controlling said passing region of the spatio-temporal prefiltering means in response to the extent of the detected picture motion, so as to substantially continuously increase an equivalent ratio of said passing region between the temporal frequency axis and the vertical spatial frequency axis in response to an increase of said extent of the detected picture motion.

6. A picture signal processing system as claimed in claim 5, wherein said means for detecting detects at least said interframe difference picture signal component and a correlative component between the horizontal and the vertical spatial frequency axes and said means for adaptively controlling produces a control signal formed in response to said extent of the detected picture motion for controlling said passing region.

7. A picture signal processing system as claimed in claim 5, further including means for detecting at least a two-dimensional spatial high frequency picture signal component and a noise component of the picture signal and means for removing a spurious interframe difference picture signal component contained in said interframe difference picture signal component and said noise component in response to threshold levels which are respectively set in response to those detected components.

8. A picture signal processing system as claimed in claim 7, including means for forming said two-dimensional spatial high frequency picture signal component by combining horizontal and vertical spatial frequency components.

9. A picture signal processing system as claimed in claim 7, wherein said noise component consists of a noise component which is detected during a vertical blanking interval and is maintained during a vertical scanning interval of the interframe difference picture signal component of the picture signal.

10. A picture signal processing system as claimed in claim 1, wherein both of said spatio-temporal prefiltering means and said spatio-temporal interpolation filtering means consist of a combination of at least one horizontal spatial frequency lowpass filter, at least one vertical spatial frequency lowpass filter and at least one temporal frequency lowpass filter, which lowpass filters have cutoff frequencies corresponding to coordinate points residing in the vicinity of said symmetrical line.

11. A picture signal processing system as claimed in claim 10, wherein both of said spatio-temporal prefiltering means and said spatio-temporal interpolation filtering means consist of a plurality of said combinations of said lowpass filters, which combinations are constructed to have passing regions slightly different from one another.

12. A picture signal processing system as claimed in claim 1, wherein both of said time axis converting means and said time axis reconverting means comprise a plurality of one-line memories into which said picture signal is alternatly written-in on a given time axis and from which said picture signal is alternately readout on a required time axis different from the given time axis.

13. A picture signal processing system in which a sequential scanning wideband picture signal is converted into an interlace scanning narrowband picture signal and reconverted into substantially its original state after transmission through a narrowband transmission line, comprising at a sending end:

a picture signal generating means for generating said sequential scanning wideband picture signal, a first multidimensional spatio-temporal prefiltering means for filtering aliasing signal components caused in said picture signal by sampling required for scanning conversion to provide a filtered picture signal, a subsampling means for sampling said filtered picture signal, so as to convert said sequential scanning wideband picture signal into an interlace scanning wideband picture signal, a time axis converting means for expanding the time axis of said interlace scanning wideband picture signal, so as to convert said interlace scanning wideband picture signal into said interlace scanning narrowband picture signal, and a modulating means for modulating a carrier signal by said interlace scanning narrowband picture signal; and comprising at a receiving end:

a demodulating means for demodulating the modulated carrier signal, so as to restore said interlace scanning narrowband picture signal, a memory means for previously providing an interpolating picture signal required for subsequent time axis reconversion to be applied onto the restored interlace scanning narrowband picture signal, a second multidimensional spatio-temporal prefiltering means for filtering aliasing signal components in said picture signal caused by resampling required for subsequent time axis reconversion, a time axis reconverting means for compressing the time axis of said restored interlace scanning narrowband picture signal so as to convert said restored interlace scanning narrowband picture signal into an intermittent quasi-wideband picture signal, and for interpolating said intermittent quasi-wideband picture signal so as to substantially restore said sequential scanning wideband picture signal, and a display means for displaying the substantially restored sequential scanning wideband picture signal, wherein both of said first multidimensional spatio-temporal prefiltering means and said second multidimensional spatio-temporal prefiltering means have a passing region substantially restricted to a lower frequency region on at least a coordinate plane extending along a vertical spatial frequency axis and a temporal frequency axis of multidimensional coordinates consisting of a horizontal spatial frequency axis, a vertical spatial frequency axis and a temporal frequency axis, provided for defining said picture signal, which lower frequency region includes an origin of said multidimensional coordinates which is separated from a higher frequency region, in which said aliasing signal components appear, by a symmetrical line intercrossing both the vertical spatial frequency axis and the temporal frequency axis and equally distant from both of said origin and an imaginary origin corresponding to a sampling frequency employed for the sampling of said picture signal.

14. A picture signal processing system in which an interlace scanning narrowband picture signal is converted into a sequential scanning substantially wideband picture signal after transmission through a narrowband transmission line, comprising at a sending end:

a picture signal producing means for producing said interlace scanning narrowband picture signal to be transmitted, and comprising at a receiving end:

a time axis converting means for compressing the time axis of the received interlace scanning narrowband picture signal, so as to convert said received interlace scanning narrowband picture signal into an intermittent quasi-wideband picture signal, a multidimensional spatio-temporal interpolation filtering means for filtering aliasing signal components in said picture signal caused by sampling required for scanning reconversion and for interpolating said intermittent quasi-wideband picture signal so as to substantially reproduce a sequential scanning wideband picture signal, and a display means for displaying the substantially reproduced sequential scanning wideband picture signal, wherein said spatio-temporal interpolation filtering means has a passing region substantially restricted to a lower frequency region on at least a coordinate plane extending along a vertical spatial frequency axis and a temporal frequency axis of multidimensional coordinates consisting of a horizontal spatial frequency axis, a vertical spatial frequency axis and a temporal frequency axis, provided for defining said picture signal, which lower frequency region includes an origin of said multidimensional coordinates which is separated from a higher frequency region, in which said aliasing signal components appear, by a symmetrical line intercrossing both of the vertical spatial frequency axis and the temporal frequency axis and equally distant from both of said origin and an imaginary origin corresponding to a sampling frequency employed for the sampling of said picture signal.

15. A picture signal processing system as claimed in claim 14, including means for modulating a carrier signal with said interlace scanning narrowband picture signal at said sending end and means for demodulating the received modulated carrier signal at said receiving end.

16. A picture signal processing system as claimed in claim 14, wherein said spatio-temporal interpolation filtering means consists of a combination of at least one vertical spatial frequency lowpass filter and at least one temporal frequency lowpass filter which lowpass filters have cutoff frequencies corresponding to coordinate points residing in the vicinity of said symmetrical line.

17. A picture signal processing system as claimed in claim 16, wherein said vertical spatial frequency lowpass filter and said temporal frequency lowpass filter are transversal filters formed of a series connection of a plurality of delay elements consisting of one-line memories and one-frame memories, respectively, which are individually weighted to produce a filtered output.

18. A picture signal processing system as claimed in claim 14, wherein the spatio-temporal prefiltering means is constructed to have a transfer function in a comparatively higher frequency region which is larger than that in a comparatively lower frequency region so as to increase a signal component existing in said comparatively higher frequency region.

19. A picture signal processing system as claimed in claim 14, further including means for detecting picture motion of said picture signal to be converted at least from an interframe difference picture signal component of said picture signal, and means for adaptively controlling said passing region of the spatio-temporal prefiltering means in response to the extent of the detected picture motion, so as to substantially continuously increase an equivalent ratio of said passing region between the temporal frequency axis and the vertical spatial frequency axis in response to an increase of said extent of the detected picture motion.

20. A picture signal processing system as claimed in claim 19, wherein said means for detecting detects at least said interframe difference picture signal component and a correlative component between the horizontal and the vertical spatial frequency axes and said means for adaptively controlling produces a control signal formed in response to said extent of the detected picture motion for controlling said passing region.

21. A picture signal processing system as claimed in claim 19, further including means for detecting at least a two-dimensional spatial high frequency picture signal component and a noise component of the picture signal and means for removing a spurious interframe difference picture signal component contained in said interframe difference picture signal component and said noise component in response to threshold levels which are respectively set in response to those detected components.

22. A picture signal processing system as claimed in claim 21, including means for forming said two-dimensional spatial high frequency picture signal component by combining horizontal and vertical spatial frequency components.

23. A picture signal processing system as claimed in claim 21, wherein said noise component consists of a noise component which is detected during a vertical blanking interval and is maintained during a vertical scanning interval of the interframe difference picture signal component of the picture signal.

24. A picture signal processing system as claimed in claim 14, wherein said spatio-temporal prefiltering means consists of a combination of at least one horizontal spatial frequency lowpass filter, at least one vertical spatial frequency lowpass filter and at least one temporal frequency lowpass filter which lowpass filters have cutoff frequencies corresponding to coordinate points residing in the vicinity of said symmetrical line respectively.

25. A picture signal processing system as claimed in claim 24, wherein said spatio-temporal prefiltering means consists of a plurality of said combinations of said lowpass filters, which combinations are constructed to have passing regions slightly different from one another.

26. A picture signal processing system as claimed in claim 14, wherein said time axis converting means comprises a plurality of one-line memories into which said picture signal is alternately written-in on a given time axis and from which said picture signal is alternately read-out on a required time axis different from the given time axis.

27. A picture signal processing system in which an interlace scanning narrowband picture signal is converted into a sequential scanning substantially wideband picture signal after transmission through a narrowband transmission line, comprising at a sending end:

a picture signal producing means for producing said interlace scanning narrowband picture to be transmitted, and comprising at a receiving end:

a memory means for providing an interpolating picture signal required for subsequent time axis conversion to be applied onto the received interlace scanning narrowband picture signal, a multidimensional spatio-temporal prefiltering means for filtering aliasing signal components in said picture signal caused by sampling required for the subsequent time axis reconversion, a time axis converting means for compressing the time axis of said received interlace scanning narrowband picture signal so as to convert said received interlace scanning narrowband picture signal into an intermittent quasi-wideband picture signal, and for interpolating said intermittent quasi-wideband picture signal so as to substantially reproduce a sequential scanning wideband picture signal, and a display means for displaying the substantially reproduced sequential scanning wideband picture signal, wherein said spatio-temporal prefiltering means has a passing region substantially restricted to a lower frequency region on at least a coordinate plane extending along a vertical spatial frequency axis and a temporal frequency axis of multidimensional coordinates consisting of a horizontal spatial frequency axis, a vertical spatial frequency axis and a temporal frequency axis, provided for defining said picture signal, which lower frequency region includes an origin of said multidimensional coordinates which is separated from a higher frequency region, in which said aliasing signal components appear, by a symmetrical line intercrossing both of the vertical spatial frequency axis and the temporal frequency axis and equally distant from both of said origin and an imaginary origin corresponding to a sampling frequency employed for the sampling of said picture signal.

28. A picture signal processing system for use in converting a high quality picture signal from a sequential scanning system to an interlace system comprising:

means for providing an output of a scanned picture information signal;

a spatio-temporal filter coupled to receive the output of said scanned picture information signal and provide a filtered output, said spatio temporal filter being constructed to provide conversion of the scanned picture signal with respect to multidimensional coordinates defined by at least a horizontal spatial frequency axis, a vertical spatial frequency axis and a temporal frequency axis where at least a coordinate plane extends along the vertical spatial frequency axis and the temporal frequency axis and a symmetrical line intercrossing both the vertical spatial frequency axis and temporal frequency axis defines a lower region in which the original picture signal exists and a higher region in which an unwanted signal component appears as result of the scanning conversion and further wherein said spatial-temporal filter is constructed such that a passing region is formed substantially including said lower region having an origin of said multidimensional coordinates; and means responsive to to said filtered output for providing an interlaced picture information signal.

* * * * *